United States Patent
Cox et al.

(10) Patent No.: US 7,668,431 B2
(45) Date of Patent: Feb. 23, 2010

(54) GROMMET AND PLATE ASSEMBLY FOR SEALING FIBER OPTIC CLOSURES

(75) Inventors: Terry Dean Cox, Keller, TX (US); Omar Jaime Trevino, Fort Worth, TX (US)

(73) Assignee: Corning Cable Systems LLC, Hickory, NY (US)

( * ) Notice: Subject to any disclaimer, the term of this patent is extended or adjusted under 35 U.S.C. 154(b) by 90 days.

(21) Appl. No.: 11/804,452

(22) Filed: May 18, 2007

(65) Prior Publication Data

US 2008/0253730 A1    Oct. 16, 2008

Related U.S. Application Data

(60) Provisional application No. 60/922,804, filed on Apr. 10, 2007.

(51) Int. Cl.
     *G02B 6/00* (2006.01)
(52) U.S. Cl. ..................... 385/135; 385/134
(58) Field of Classification Search .............. 385/135
See application file for complete search history.

(56) References Cited

U.S. PATENT DOCUMENTS

| | | | | |
|---|---|---|---|---|
| 5,109,458 | A | * | 4/1992 | Dixit et al. .............. 385/102 |
| 5,155,303 | A | * | 10/1992 | Bensel et al. ............. 174/93 |
| 5,495,549 | A | * | 2/1996 | Schneider et al. .......... 385/135 |
| 5,598,499 | A | | 1/1997 | Burek et al. .............. 385/138 |
| 6,533,472 | B1 | | 3/2003 | Dinh et al. ............... 385/95 |
| 7,349,616 | B1 | | 3/2008 | Castonguay et al. ........ 385/135 |
| 7,433,566 | B2 | | 10/2008 | Bookbinder et al. ........ 385/128 |
| 7,450,807 | B2 | | 11/2008 | Bickham et al. ........... 385/126 |
| 7,499,622 | B2 | | 3/2009 | Castonguay et al. ........ 385/135 |
| 7,505,660 | B2 | | 3/2009 | Bickham et al. ........... 385/125 |
| 2004/0211774 | A1 | | 10/2004 | Daoud et al. .............. 220/4.02 |

(Continued)

FOREIGN PATENT DOCUMENTS

EP      0514174 A1    11/1992

(Continued)

OTHER PUBLICATIONS

Patent Cooperation Treaty, International Search Report for International Application No. PCT/US2008/004344, Aug. 19, 2008, 2 pages.

*Primary Examiner*—Uyen-Chau N Le
*Assistant Examiner*—Kajli Prince
(74) *Attorney, Agent, or Firm*—John H. Vynalek

(57) ABSTRACT

There is provided grommet and plate assemblies for sealing fiber optic closures into which and/or out of which fiber optic cables are routed. The grommet of the assembly includes a central portion with an axial opening adapted to receive the fiber optic cable through a slit in the central portion. The grommet also includes an end cap portion on an axial end of the grommet, and the end cap portion includes a deformable outer lip that overhangs an outer surface of the central portion to provide axial retention of the grommet once it is inserted into an opening of the plate. The plate includes a plurality of openings into which grommets may be selectively inserted. The plate may be received within an opening of the fiber optic closure and includes a slot for receiving a protrusion within the opening of the fiber optic closure.

21 Claims, 22 Drawing Sheets

U.S. PATENT DOCUMENTS

| | | | |
|---|---|---|---|
| 2004/0256138 A1 | 12/2004 | Grubish et al. | 174/93 |
| 2005/0271344 A1 | 12/2005 | Grubish et al. | 385/135 |
| 2006/0222309 A1 | 10/2006 | Grubish et al. | 385/135 |
| 2007/0036488 A1 | 2/2007 | Harrison et al. | 385/76 |
| 2008/0056654 A1 | 3/2008 | Bickham et al. | 385/124 |
| 2008/0166094 A1 | 7/2008 | Bookbinder et al. | 385/124 |

FOREIGN PATENT DOCUMENTS

| | | |
|---|---|---|
| FR | 2780209 | 12/1999 |
| JP | 2002-207127 | 7/2002 |
| JP | 2003-57512 | 2/2003 |

* cited by examiner

GROMMET AND PLATE ASSEMBLY FOR SEALING FIBER OPTIC CLOSURES

CROSS REFERENCE TO RELATED APPLICATION

The present application claims priority pursuant to 35 U.S.C. 119(e) to U.S. Provisional Application, Ser. No. 60/922,804, entitled "Grommet and Plate Assembly for Sealing Fiber Optic Closures" and filed Apr. 10, 2007.

BACKGROUND OF THE INVENTION

1. Field of the Invention

The present invention is related to fiber optic closures, and more particularly, to sealing assemblies for the passage of fiber optic cables into and out of the closures.

2. Description of Related Art

Fiber optic closures are typically used at various locations along a fiber optic network, such as at a local convergence point, a network access point, and/or at a subscriber demarcation point. The closures typically include an opening through which one or more fiber optic cables enter the closure and/or exit the closure. These openings are usually sealed to prevent the ingress of dust, water (such as wind-driven rain), infestation, and the like into the closure that might adversely affect the performance of the fiber optic components and/or connections within the closure.

Conventional fiber optic closures include grommets that comprise a series of concentric circular portions of various diameters that enable a field technician to selectively remove one or more portions such that the grommet defines an opening approximately the size of the fiber optic cable to be routed through the grommet. Such grommets also require the use of an RTV sealant to further seal around the cable and/or the grommet. The use of such sealants can be inefficient, can lead to unintentional messes when applying or subsequently handling, and/or can be difficult to remove if subsequent manipulation of the fiber optic cable is desired. Alternative fiber optic closures include one or more seals used in combination with a compression nut or the like through which the fiber optic cable is routed and then the seal is compressed. Such assemblies can be expensive, can be difficult to assemble, and/or may provide inadequate or inconsistent sealing.

Therefore, a need exists for an improved fiber optic closure that provides affordable, convenient, and reliable sealing of fiber optic cables entering and exiting the fiber optic closure.

BRIEF SUMMARY OF THE INVENTION

The various embodiments of the present invention address the above needs and achieve other advantages by providing a grommet and plate assembly adapted for use in the openings of fiber optic closures. The combination of the grommet(s) and plate allow the present invention to be used in existing fiber optic closures to provide sealed passage of fiber optic cables into the fiber optic closure. Still further embodiments of the present invention provide a grommet with or without a plate that enables fiber optic cables to be conveniently sealed when passed through an opening in the fiber optic closure.

One embodiment of the present invention comprises a grommet adapted for use with a fiber optic closure that is adapted to receive the grommet to provide a substantially sealed passage for a fiber optic cable passing through an opening in the closure. The grommet comprises a central portion defining an axial opening adapted to selectively receive the fiber optic cable. The central portion defines an outer surface, and in some embodiments the outer surface defines a generally frustoconical shape and/or includes ribs or the like. The grommet also comprises a slit extending in a generally radial direction from the outer surface of the central portion to the axial opening of the central portion. The slit is adapted to allow selective passage of the fiber optic cable from outside the central portion to the axial opening of the central portion. The grommet further comprises an end cap portion provided at an axial end of the central portion, and the end cap portion defines a selectively deformable outer lip that generally overhangs the outer surface of the central portion. The overhanging lip of the grommet provides an improved seal and improved retention of the grommet an the opening into which the grommet is received.

Further embodiments of the present invention include a grommet and plate assembly comprising a plate adapted to be selectively received within an opening of the closure. The plate further includes a plurality of openings into which grommets similar to those described above may be selectively inserted.

Still further embodiments of the present invention provide methods for routing a fiber optic cable into and/or out of a fiber optic closure while providing a seal. Therefore, the grommets, grommet and plate assemblies, and associated methods of the present invention provide for affordable, convenient, and reliable sealing of fiber optic cables entering and exiting the fiber optic closure.

BRIEF DESCRIPTION OF THE SEVERAL VIEWS OF THE DRAWINGS

Figure 1:
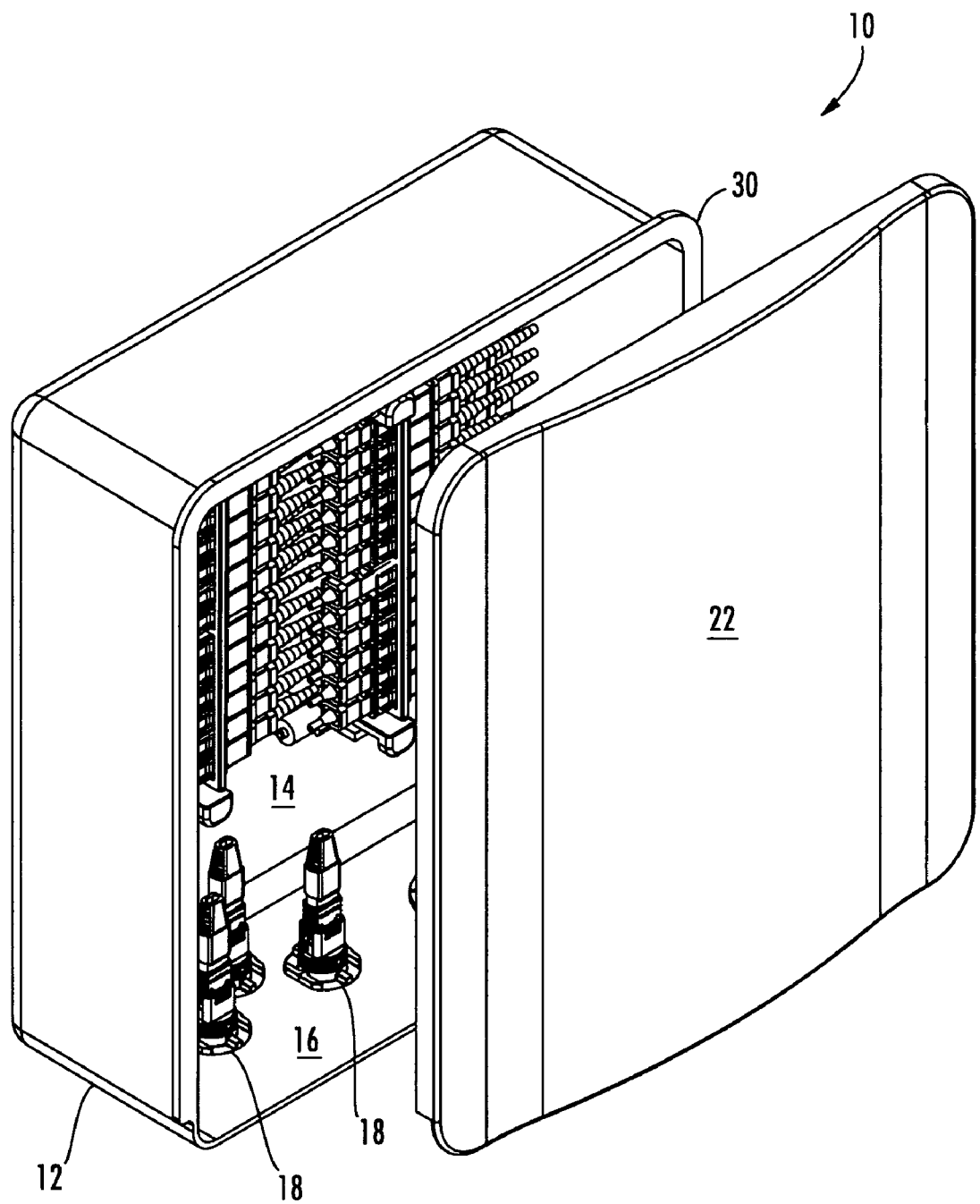
Figure 2:
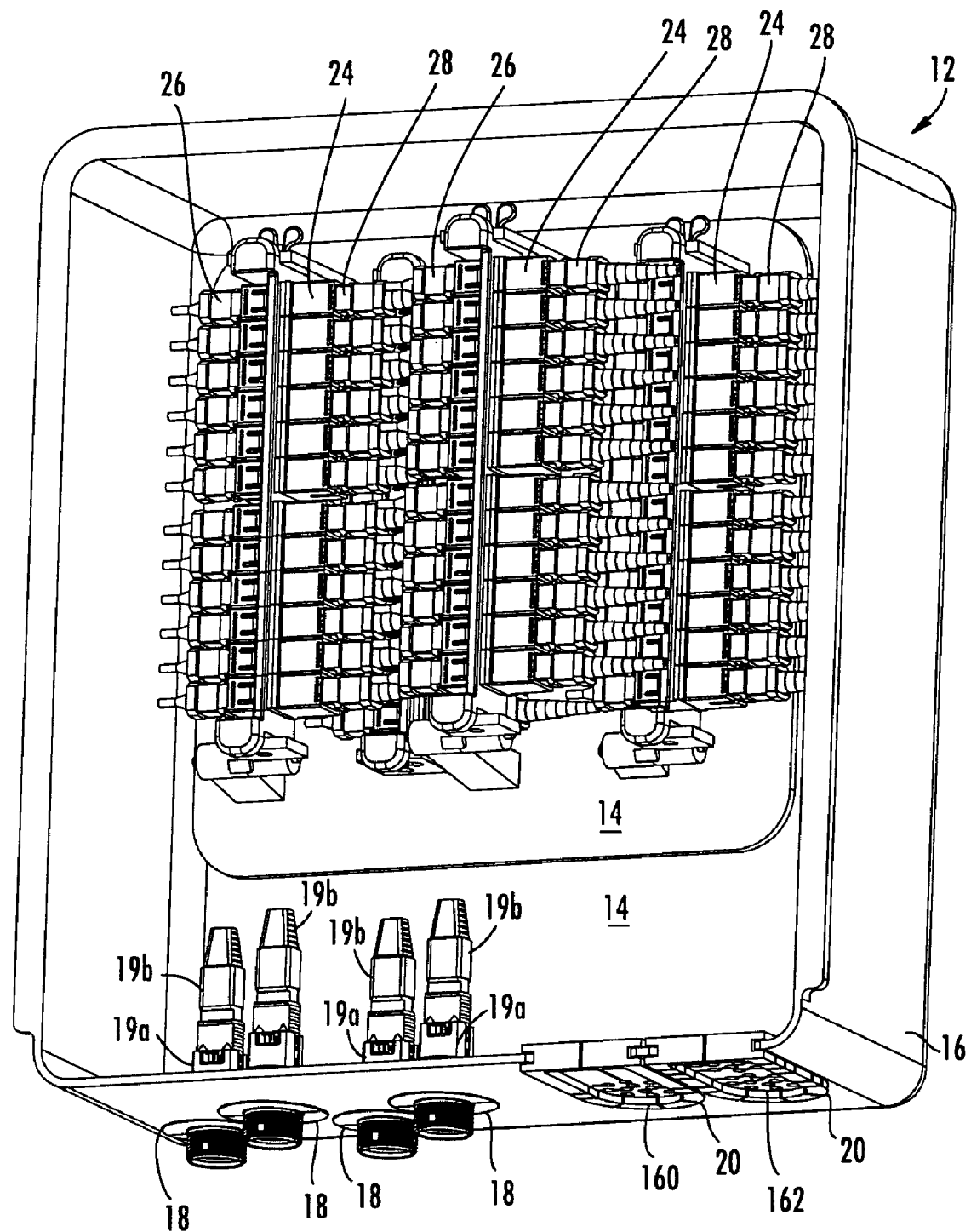
Figure 3:
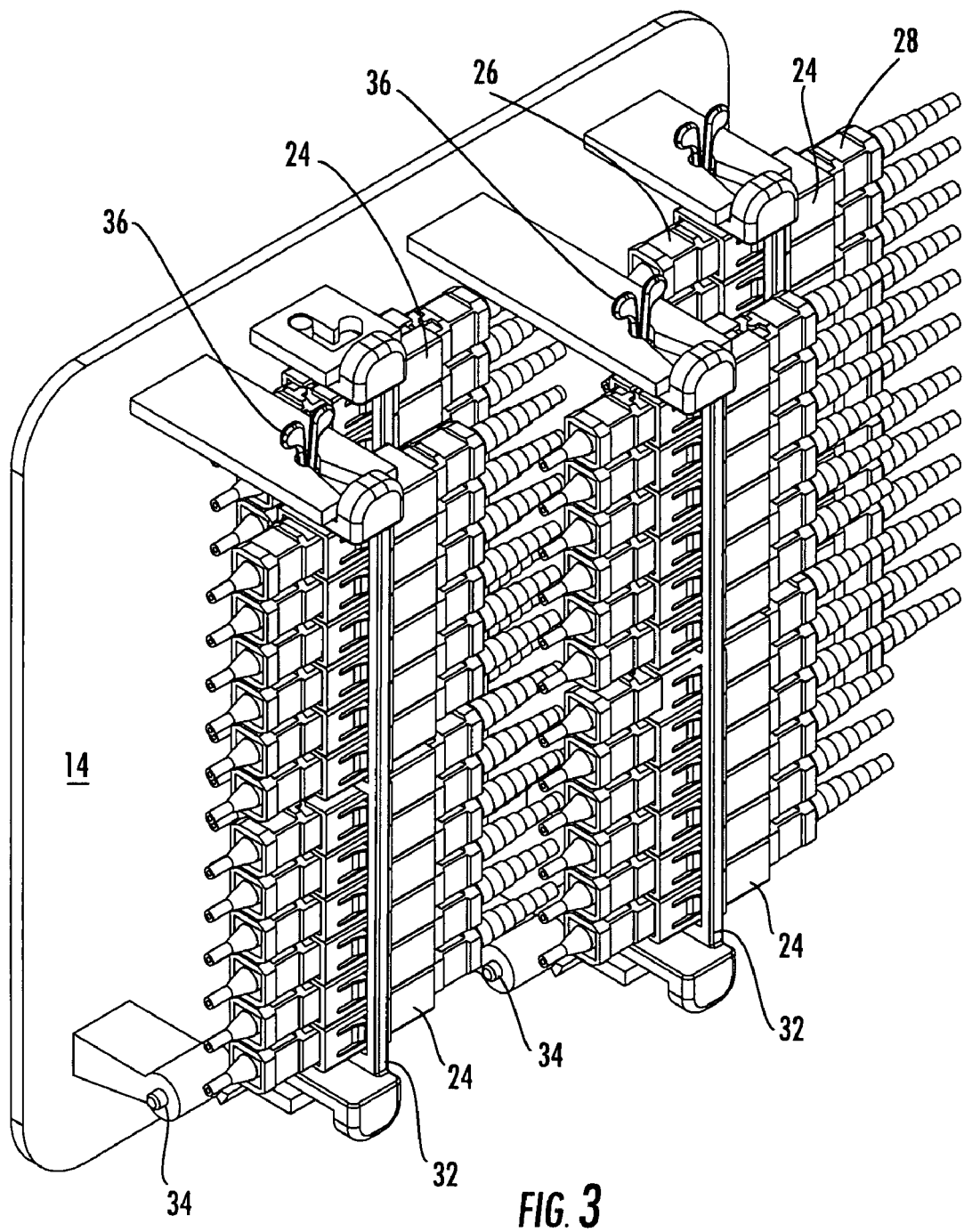
Figure 4:
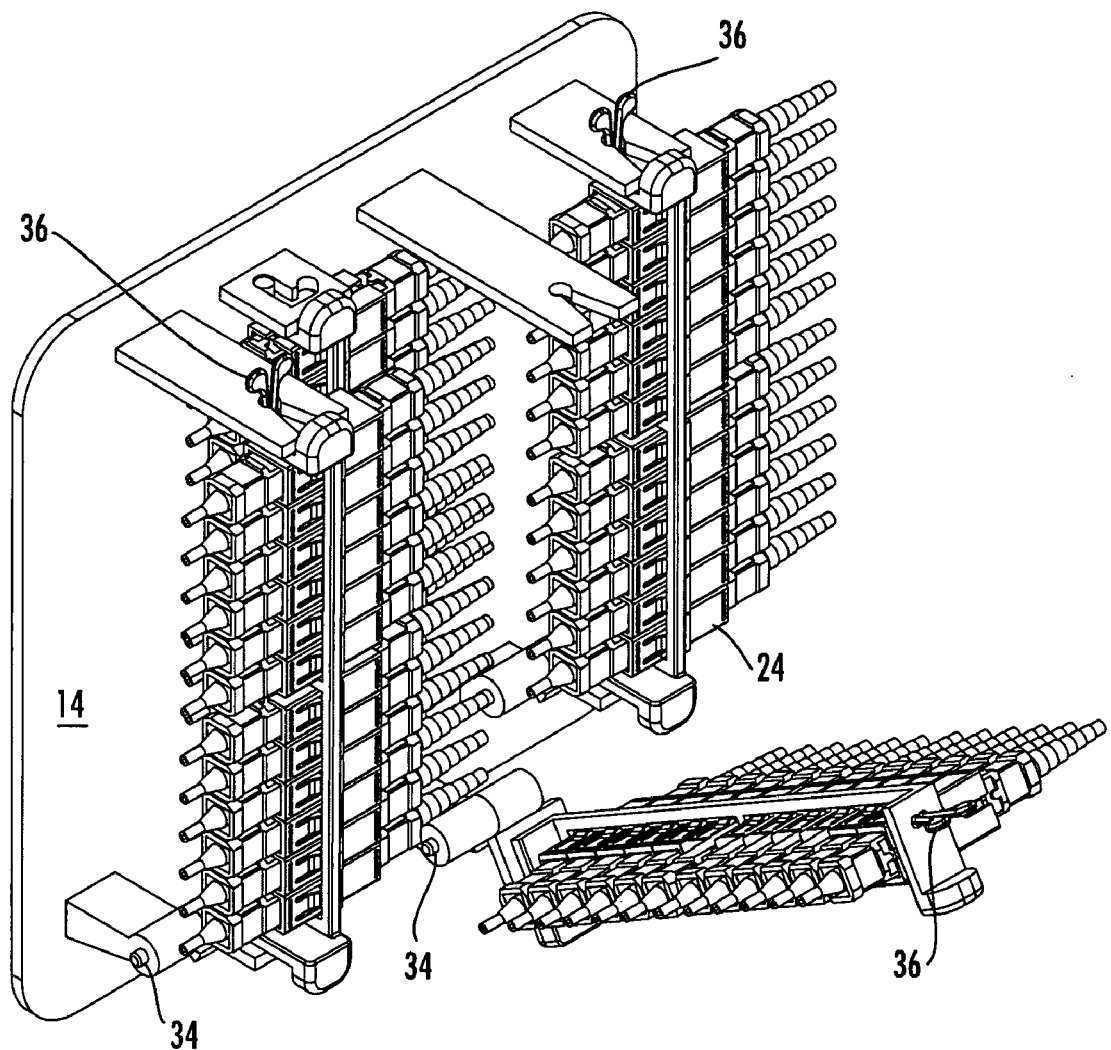
Figure 5:
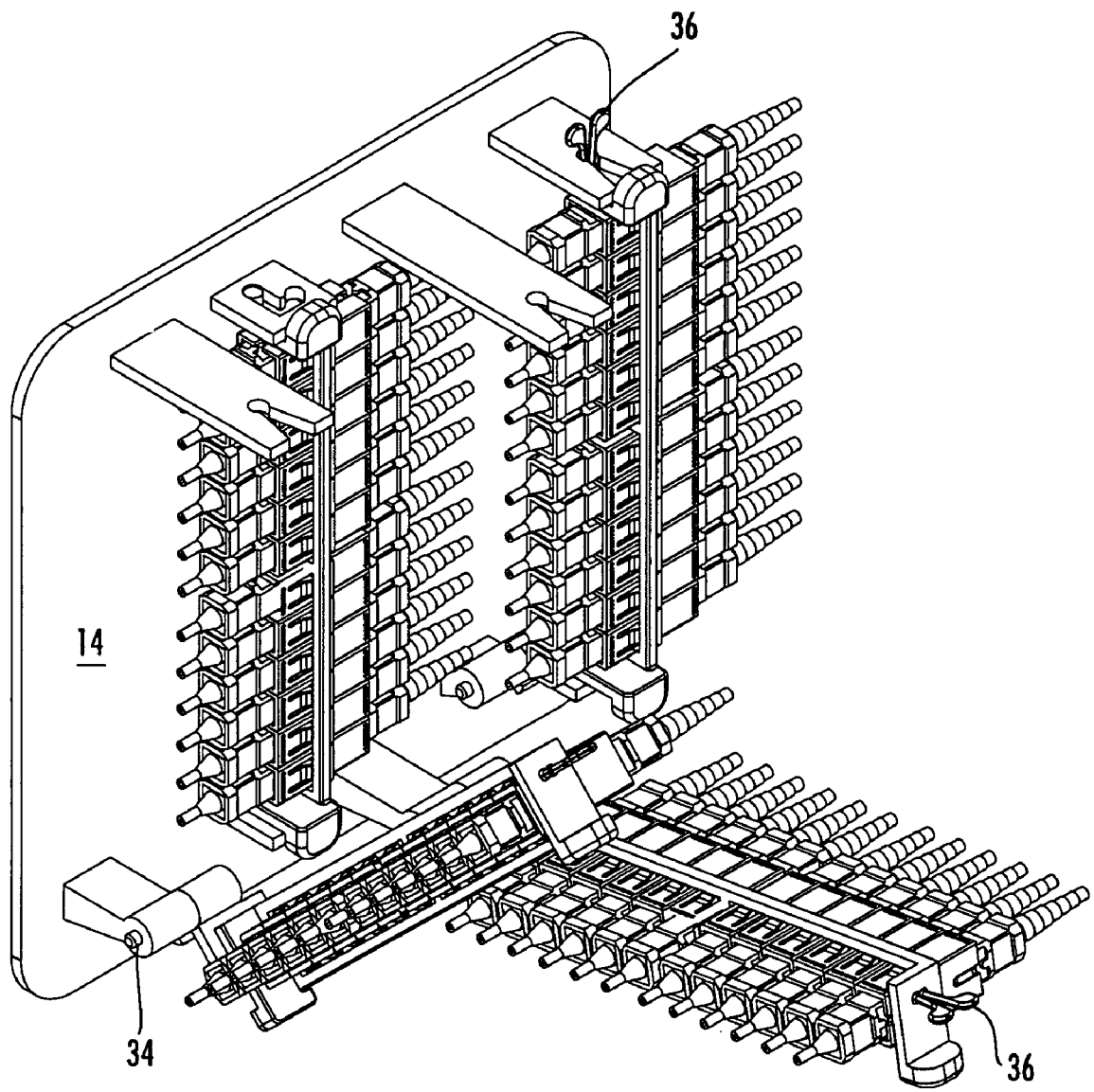
Figure 6:
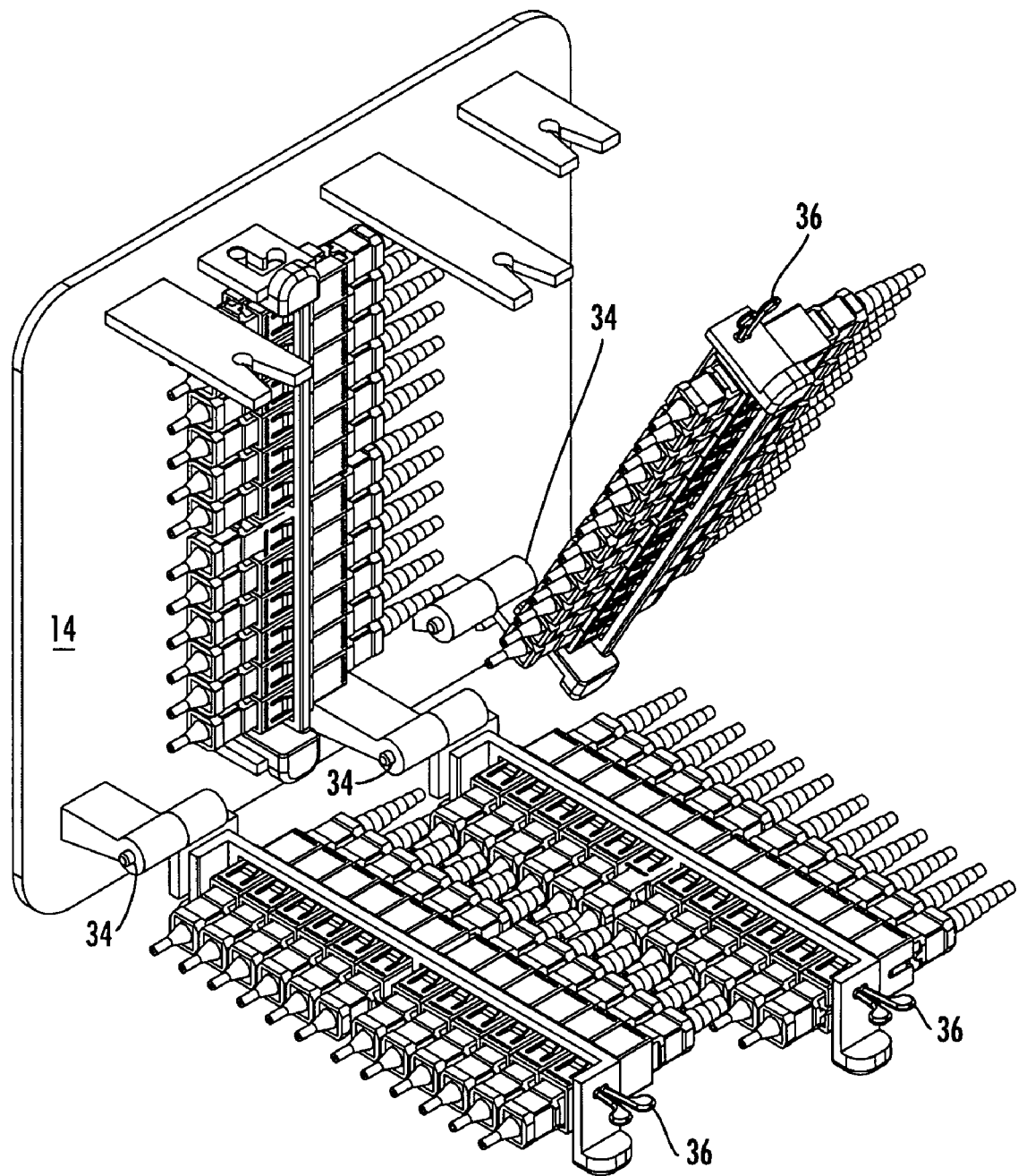
Figure 7:
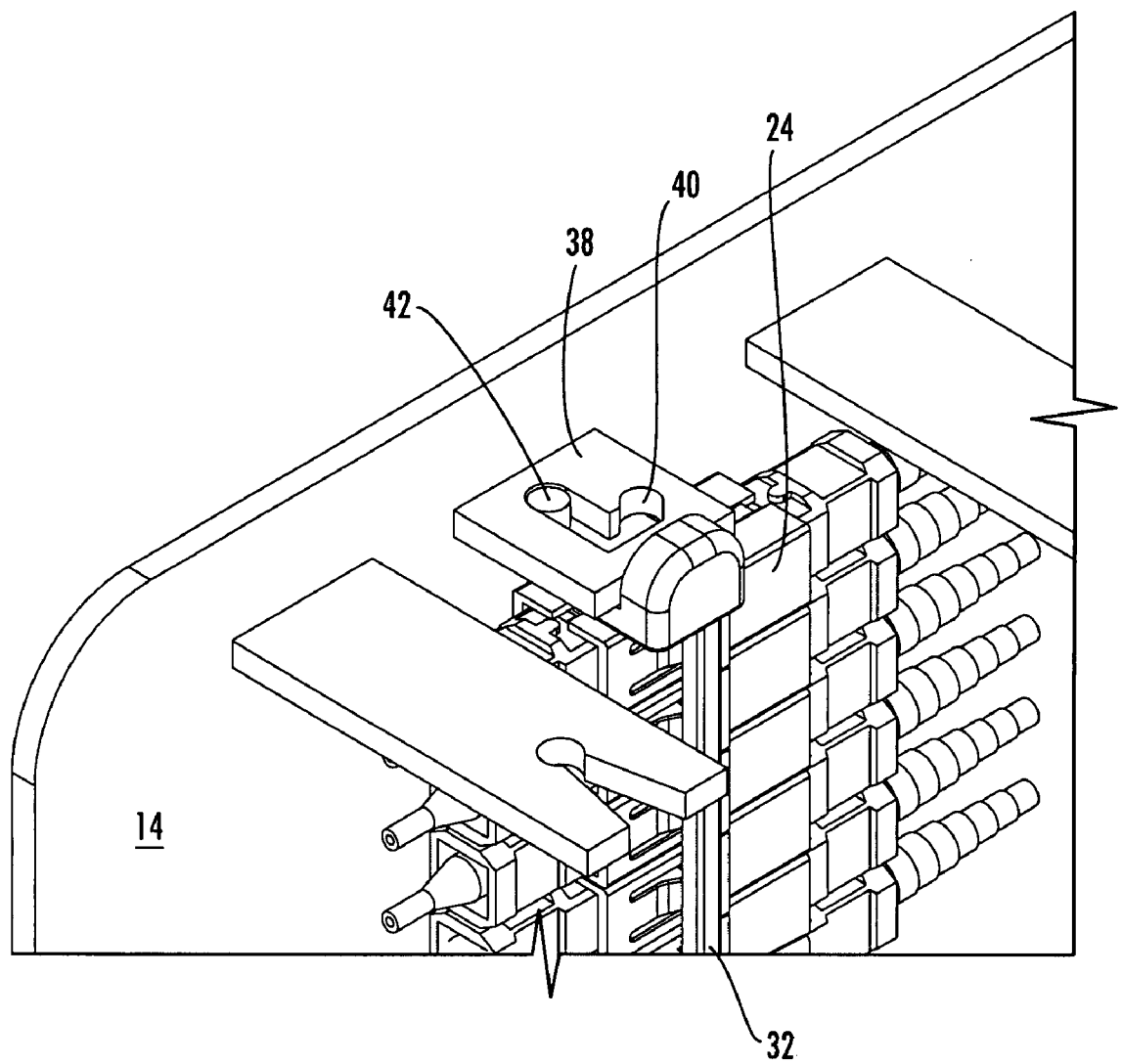
Figure 8:
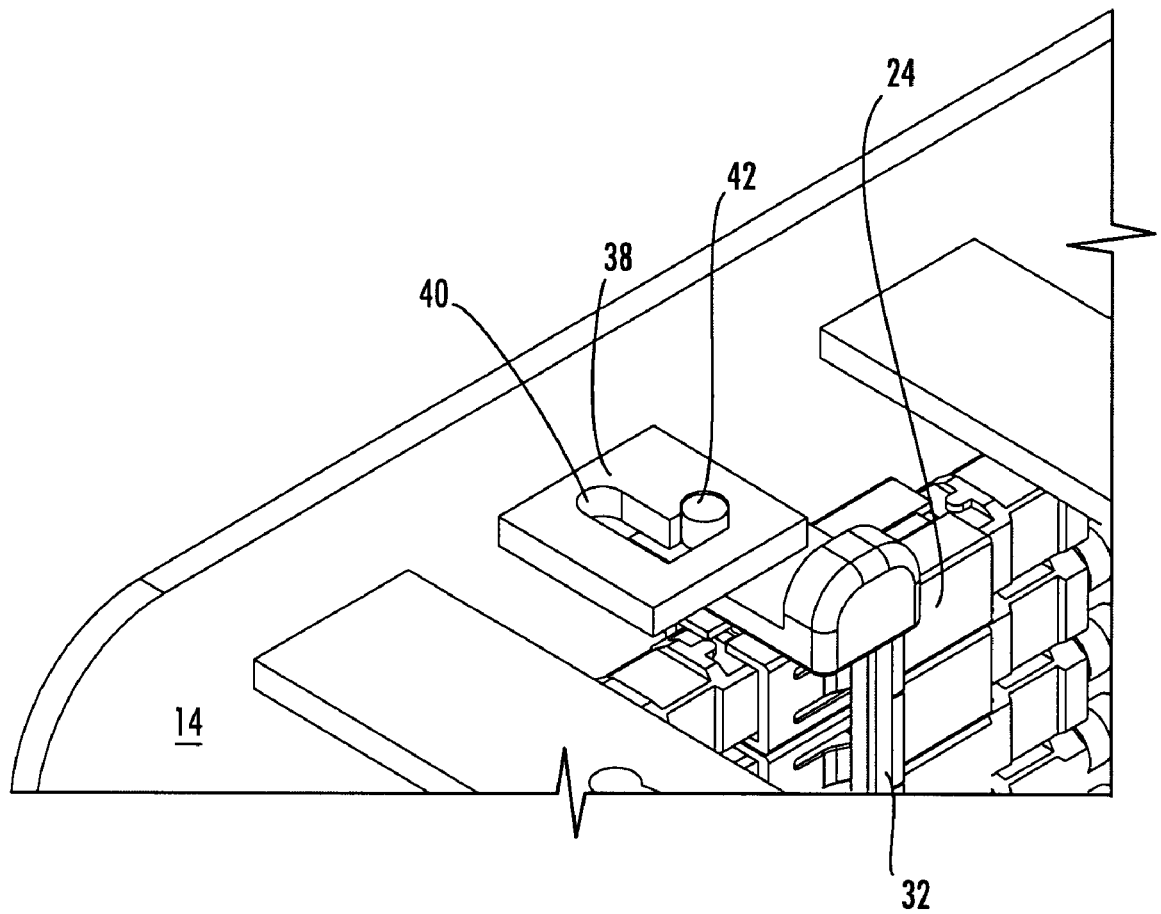
Figure 9:
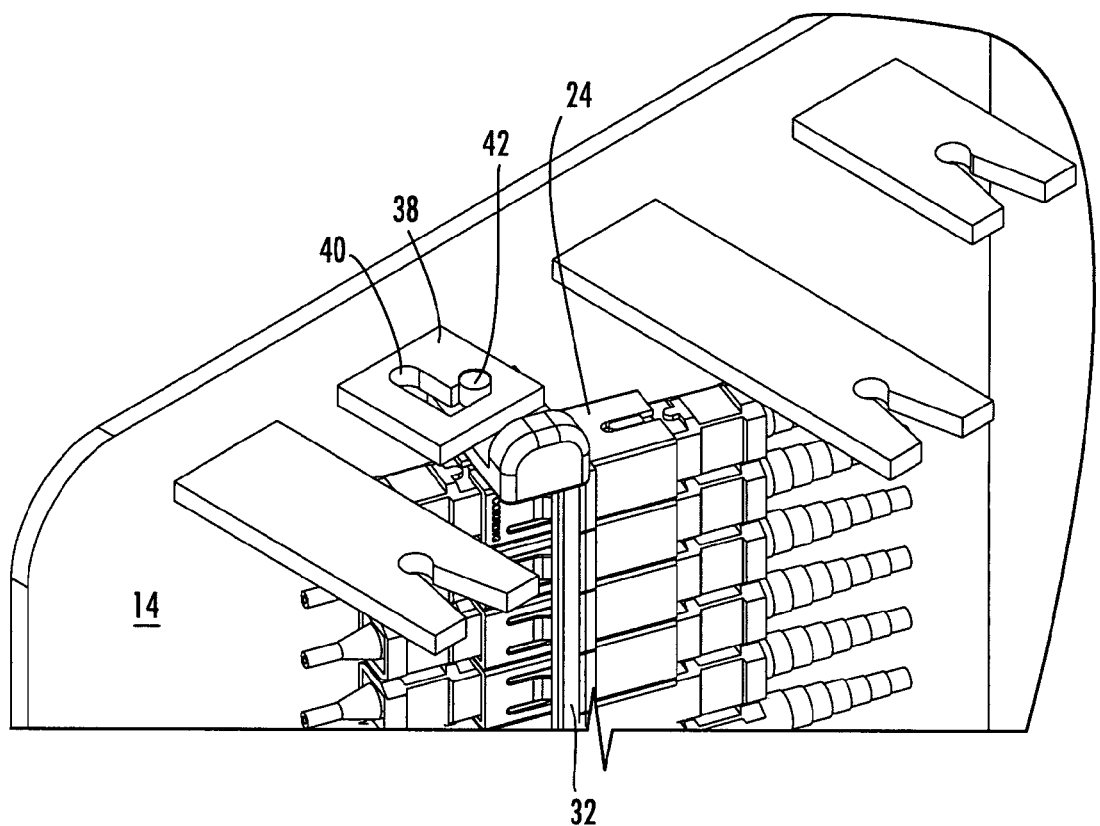
Figure 10:
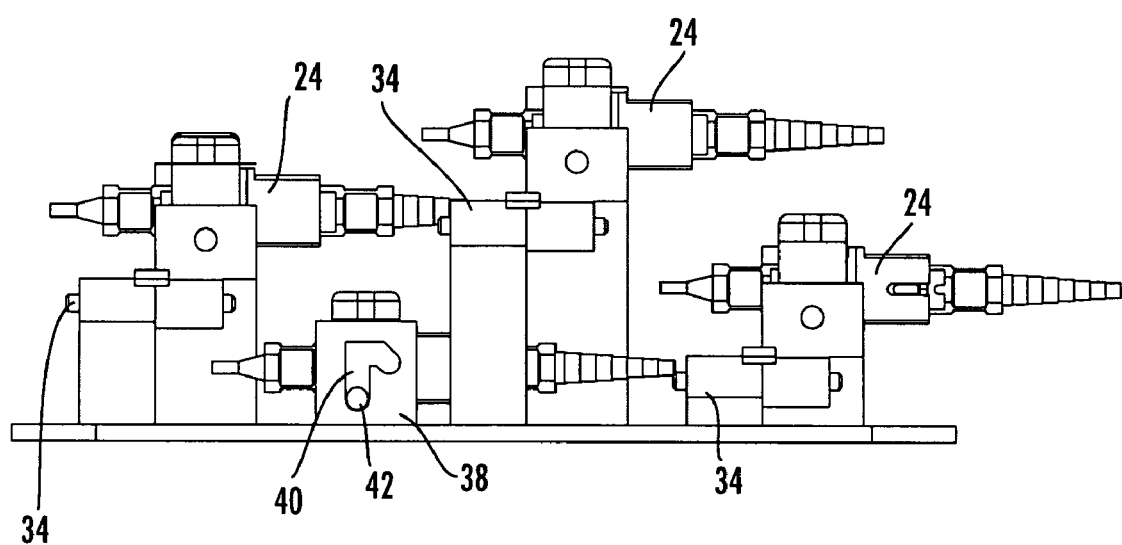
Figure 11:
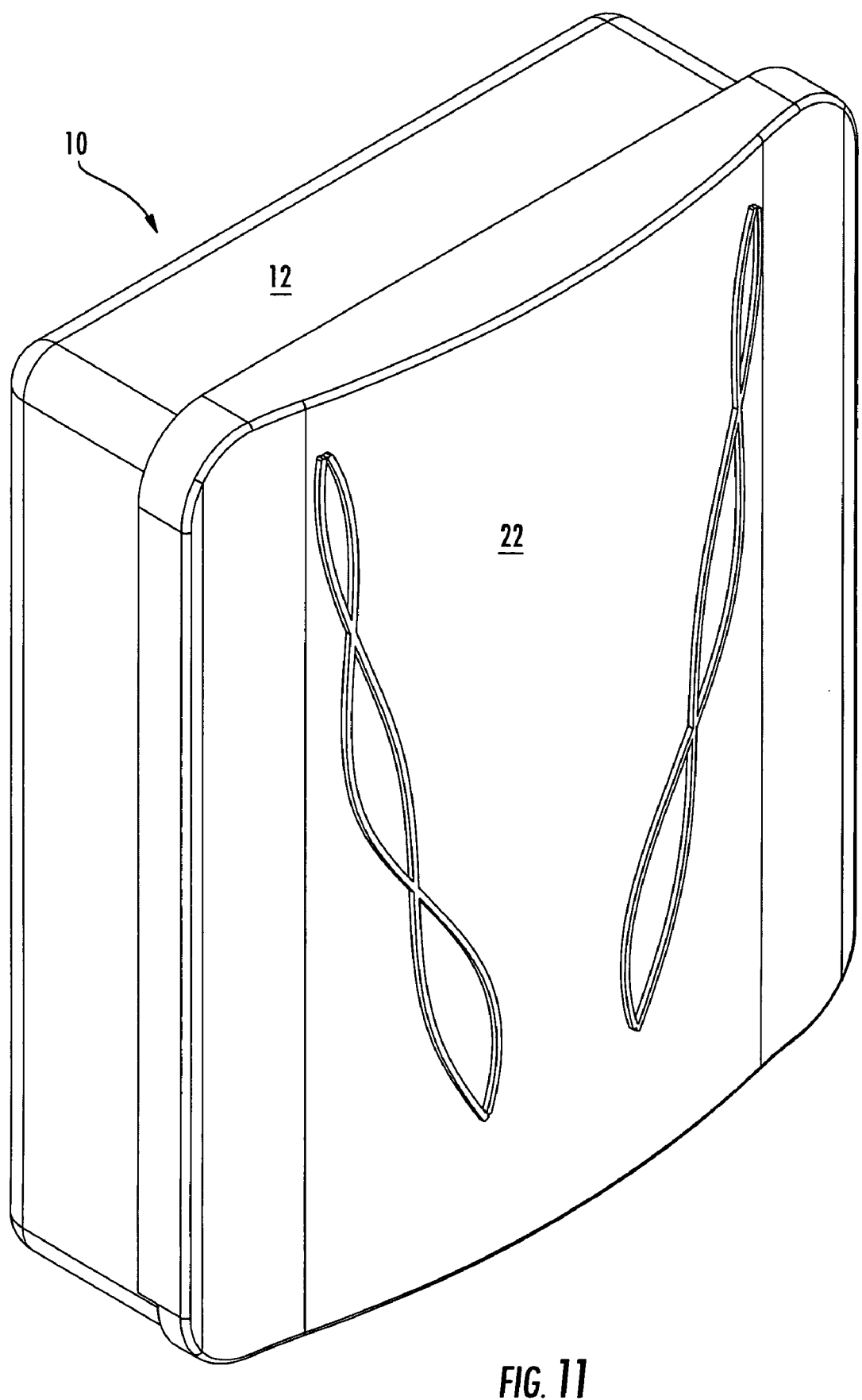
Figure 12:
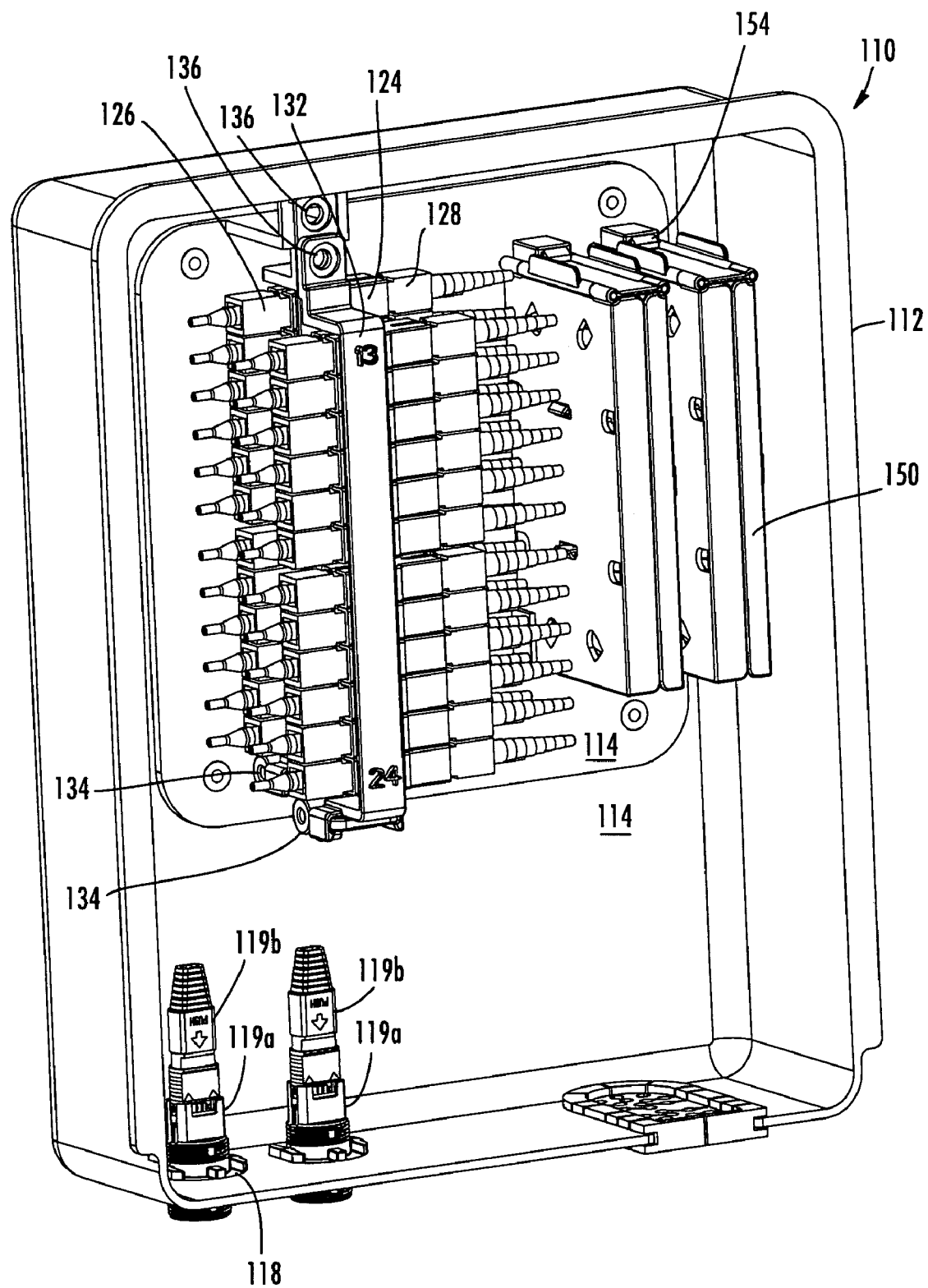
Figure 13:
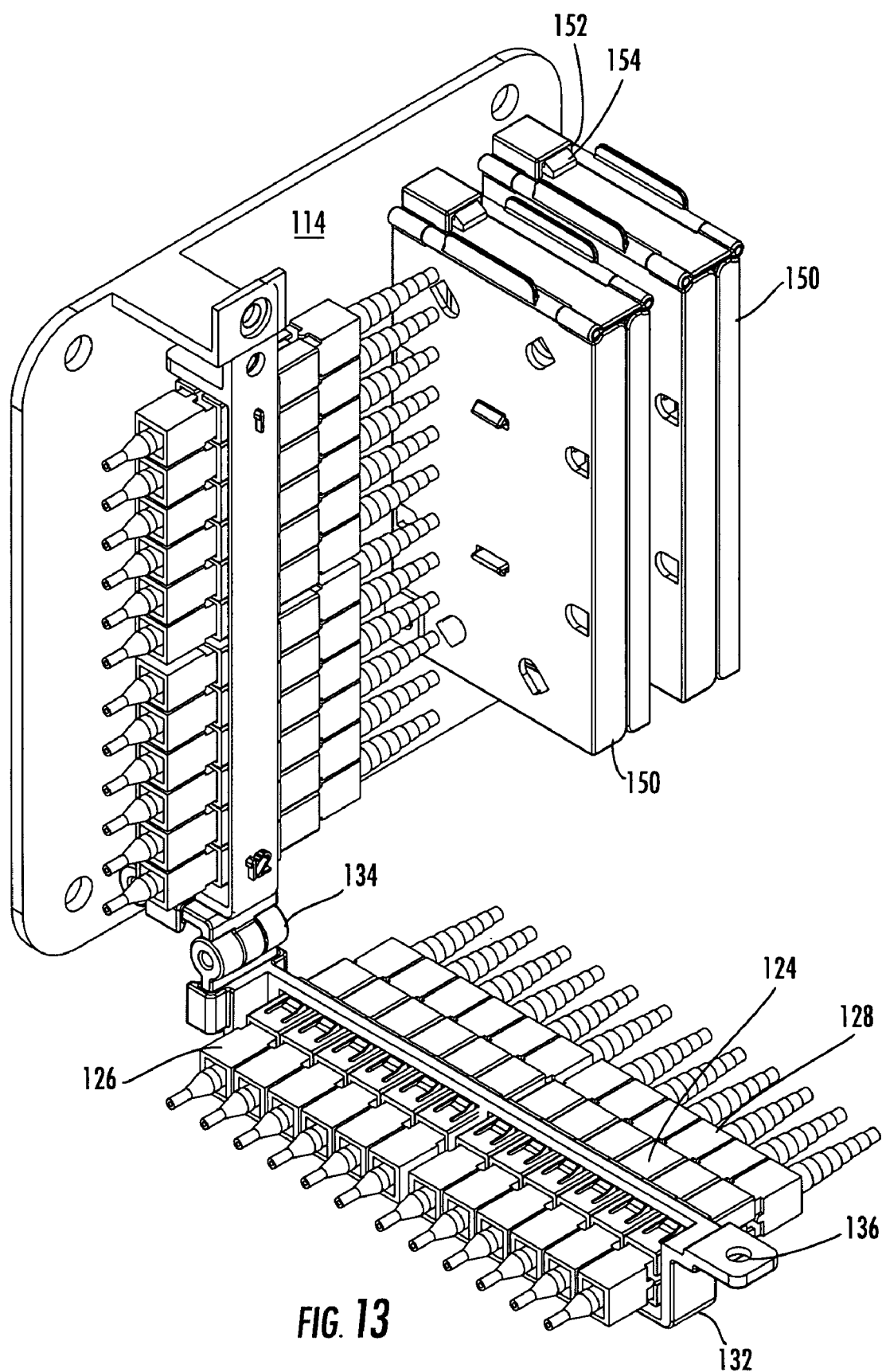
Figure 14:
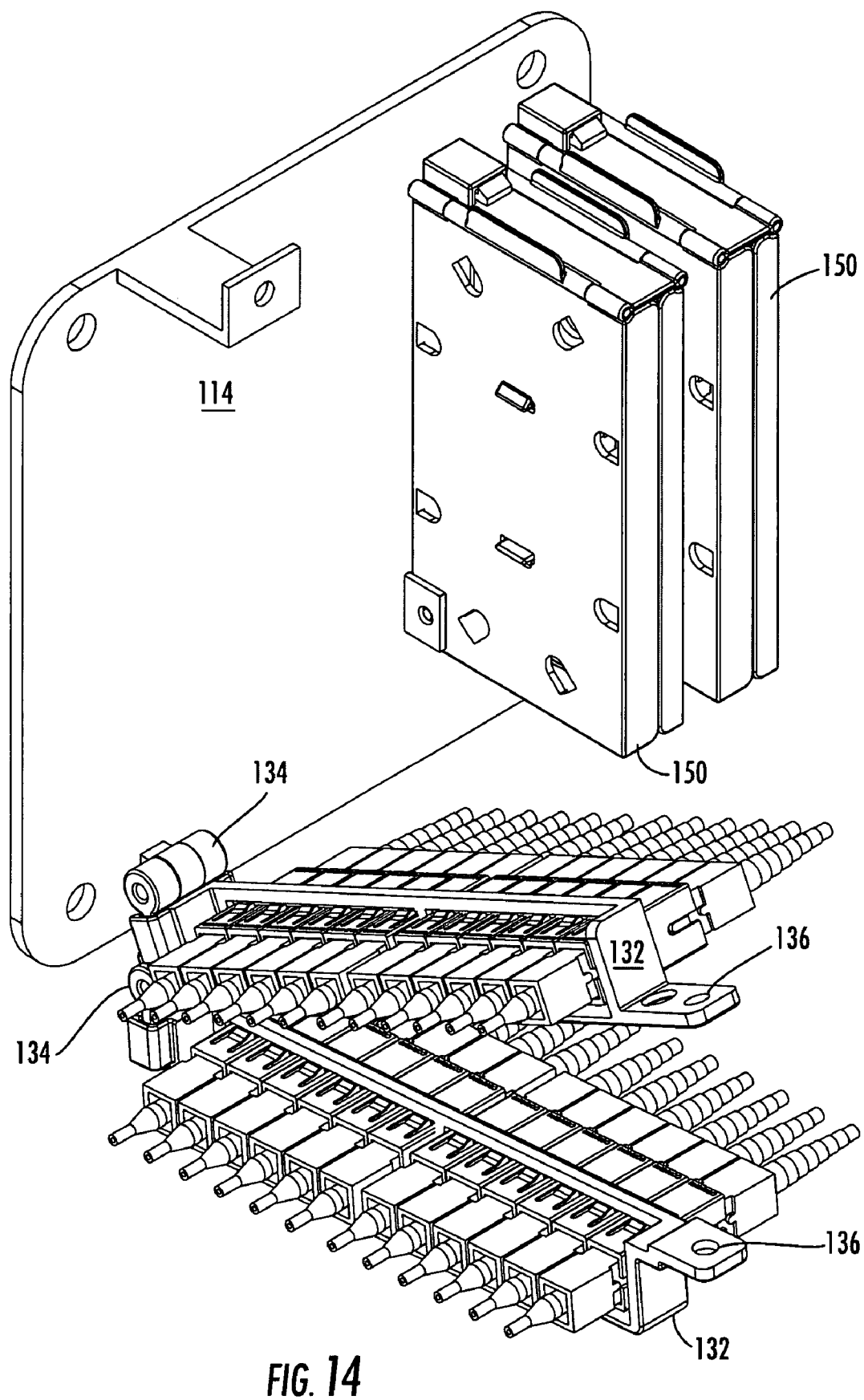
Figure 15:
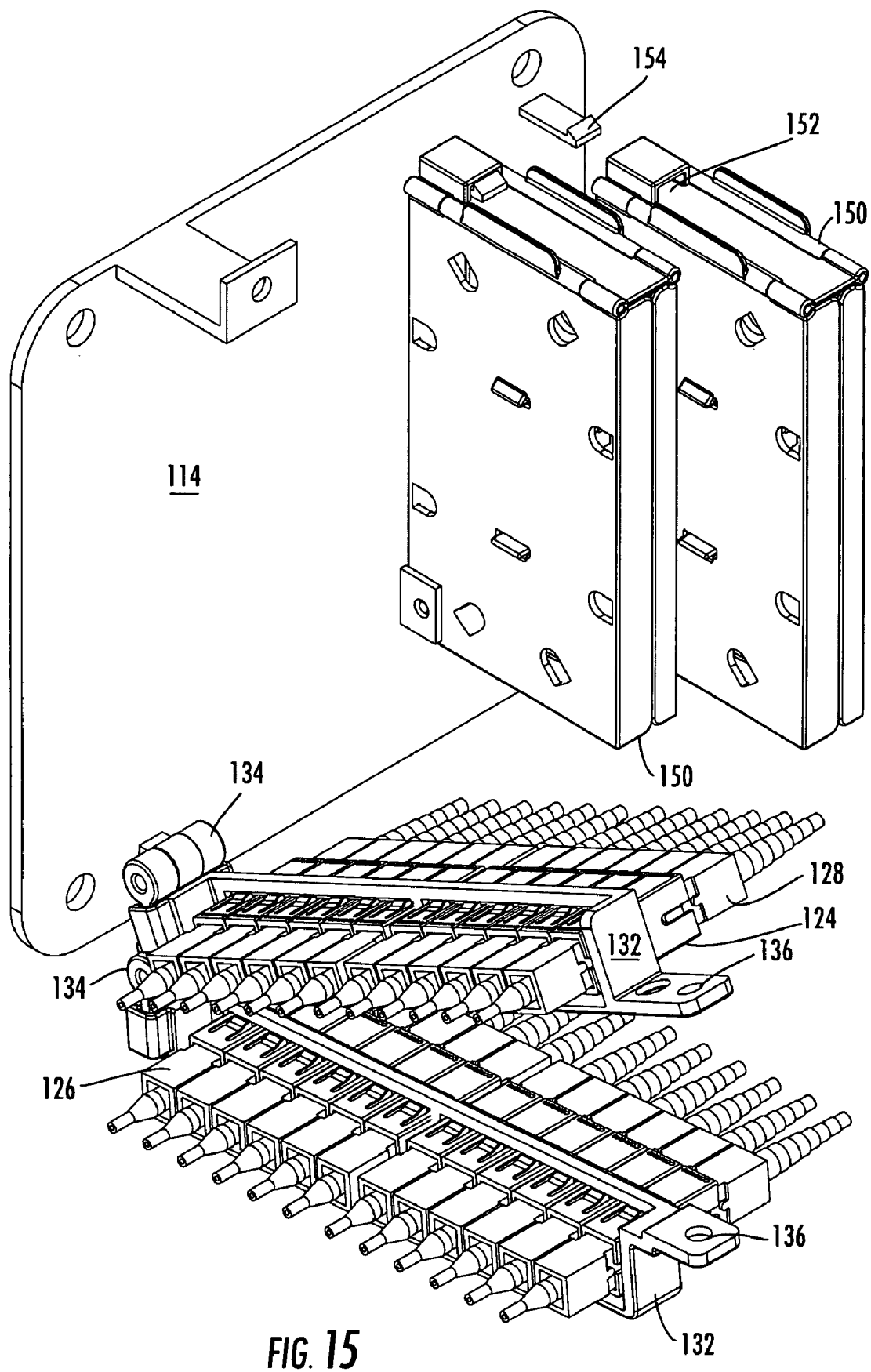
Figure 16:
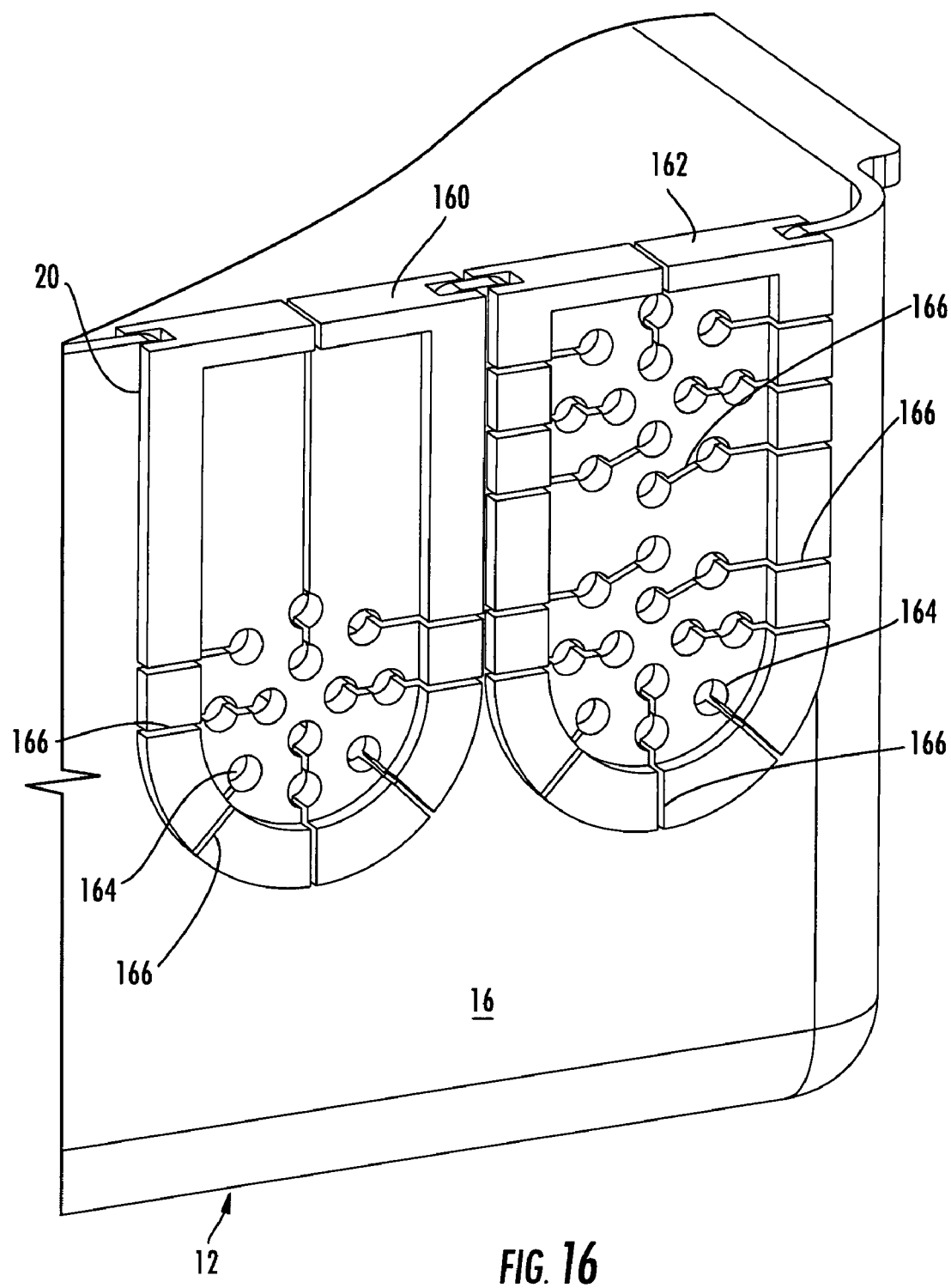
Figure 17:
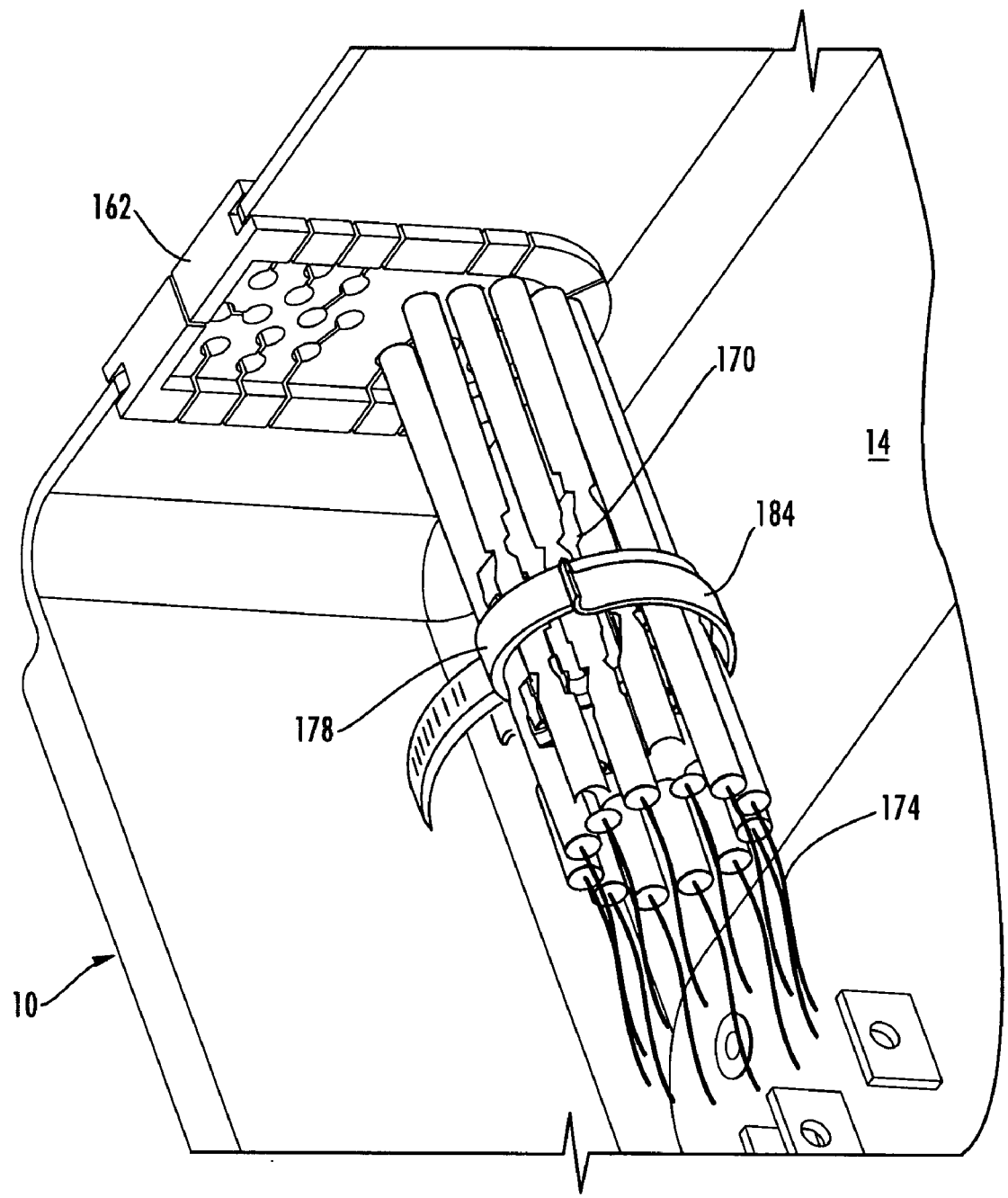
Figure 18B:
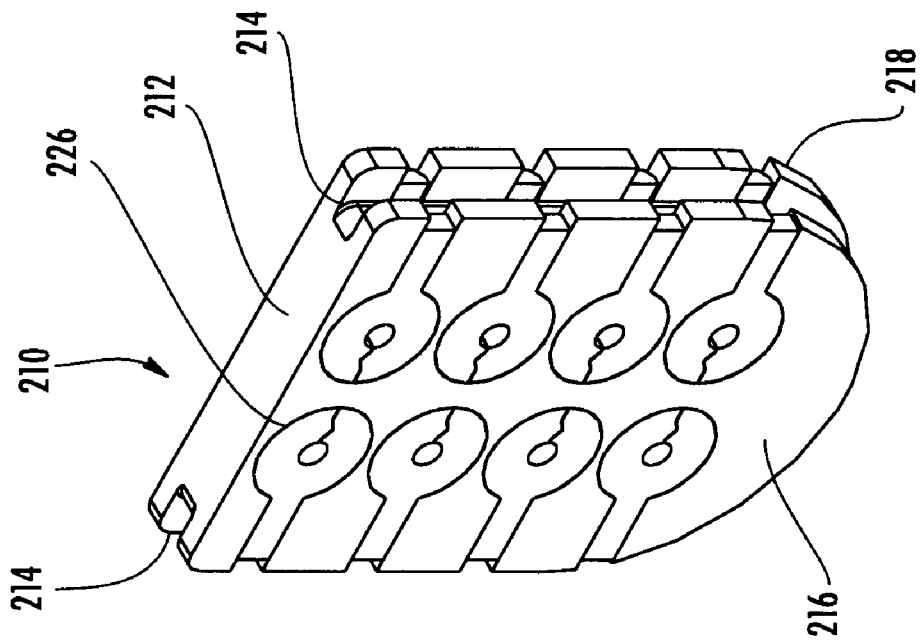
Figure 18A:
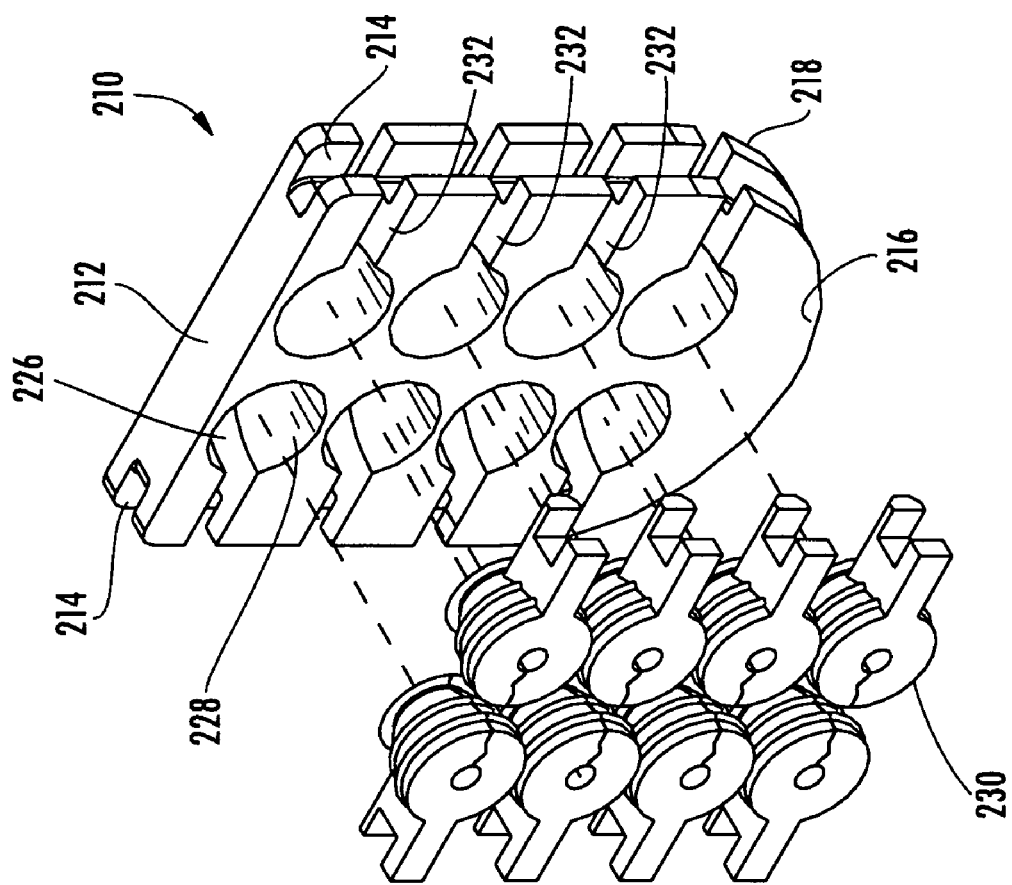
Figure 19B:
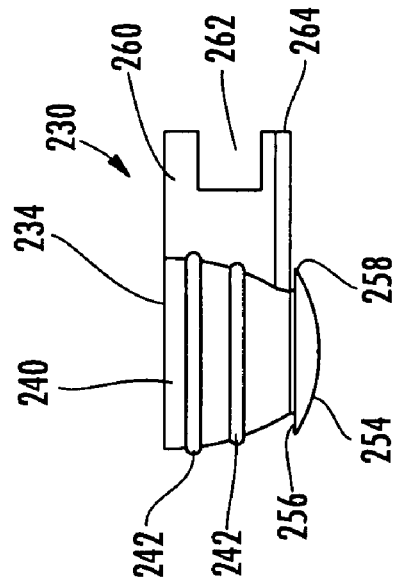
Figure 19D:
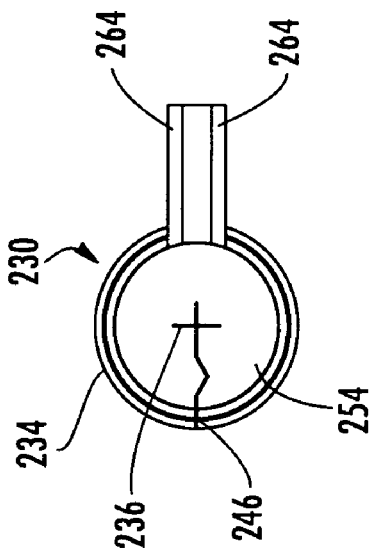
Figure 19A:
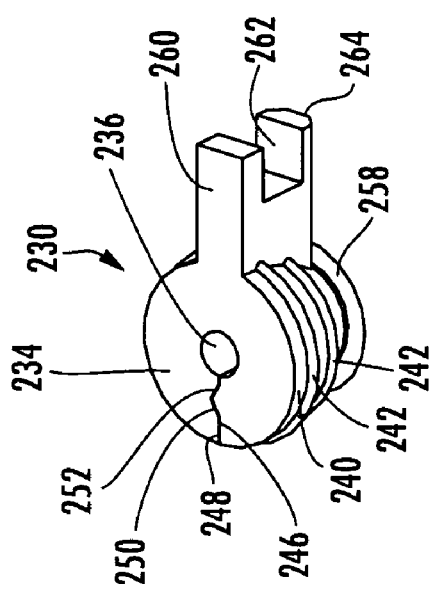
Figure 19C:
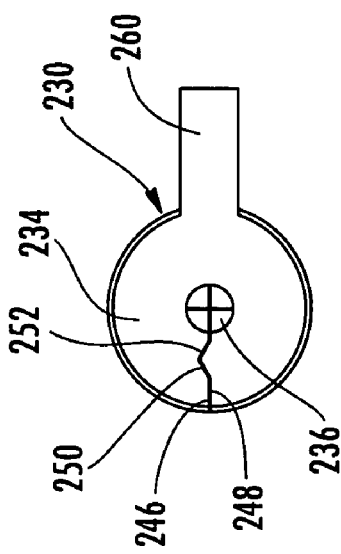
Figure 20B:
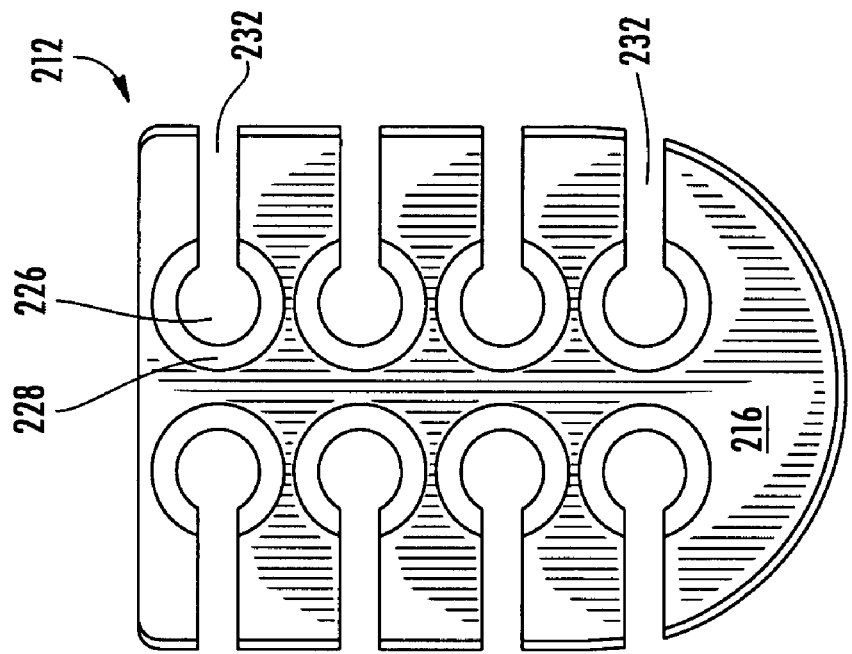
Figure 20A:
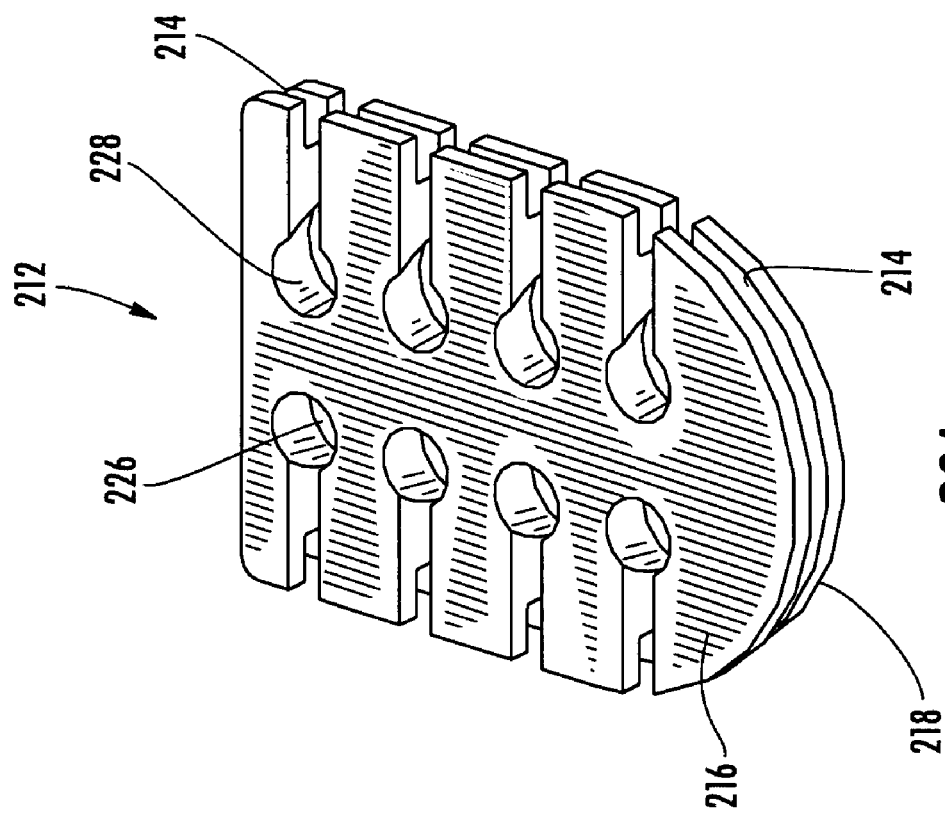
Figure 21B:
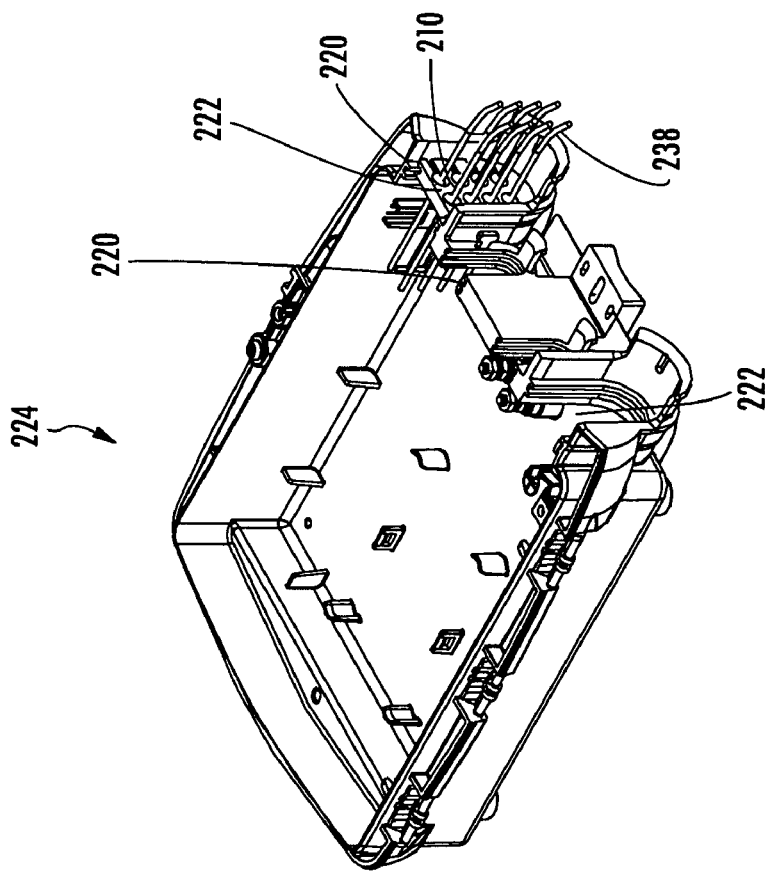
Figure 21A:
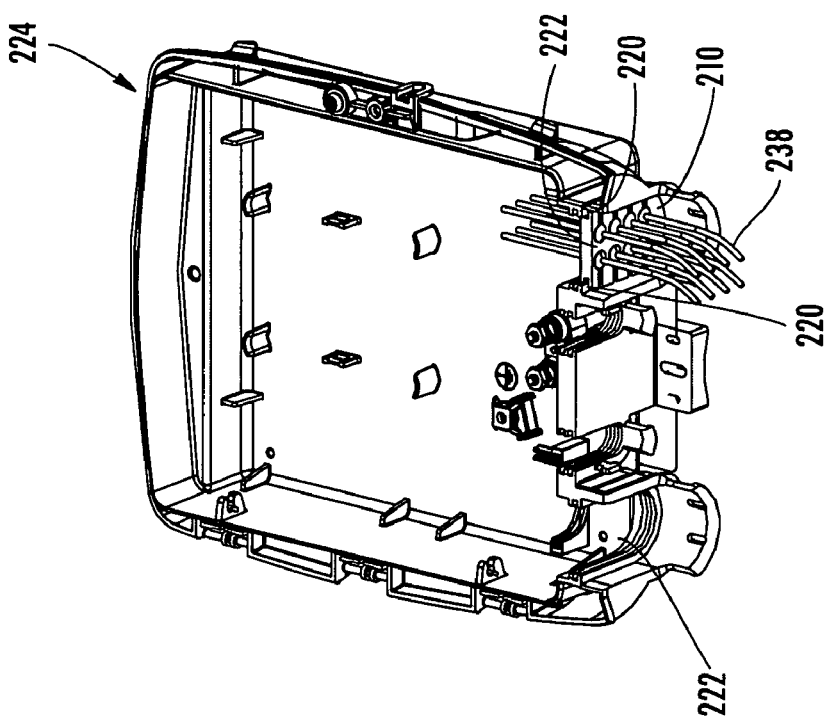
Figure 22:
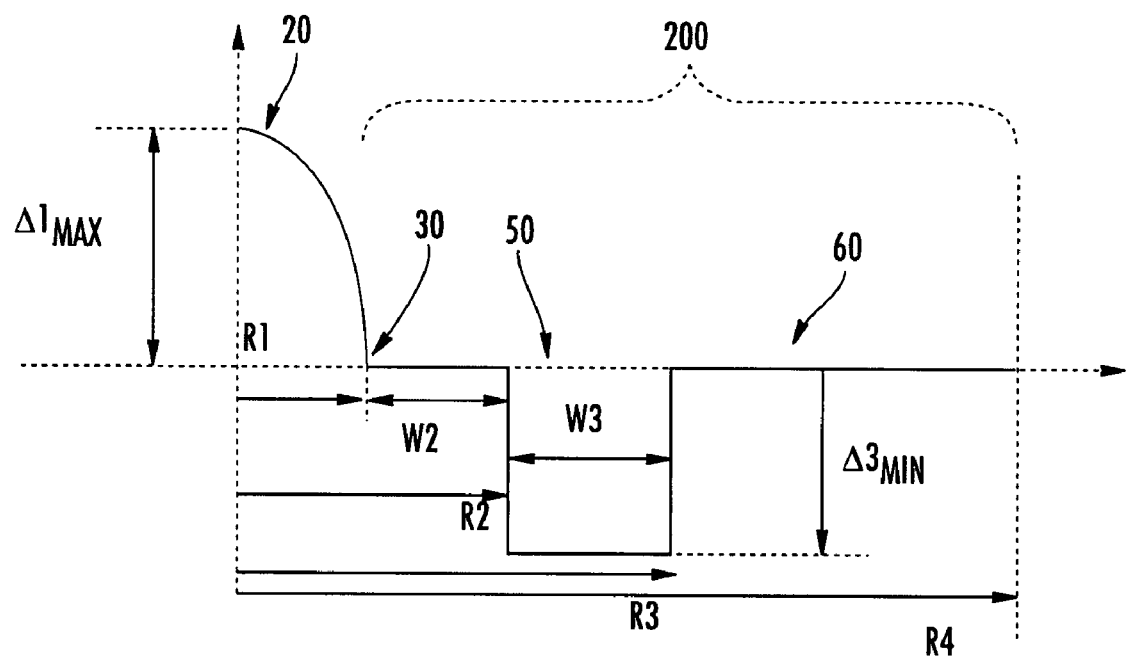

Having thus described the invention in general terms, reference will now be made to the accompanying drawings, which are not necessarily drawn to scale and are meant to be illustrative and not limiting, and wherein:

FIG. 1 is a perspective view of a fiber drop terminal ("FDT") in accordance with a first embodiment of the present invention, illustrating the cover selectively removed from the base;

FIG. 2 is a perspective view of the FDT of FIG. 1, illustrating four pluralities of adapters joined to the back wall of the base and a plurality of openings in the sidewall of the base for passage of four distribution cables and 48 drop cables;

FIG. 3 is a perspective view of the four pluralities of adapters of the FDT of FIG. 1, illustrating horizontal hinge at the lower end of vertical bars to which the pluralities of adapters are connected and illustrating the latch at the upper end of the vertical bars;

FIG. 4 is a perspective view of the four pluralities of adapters of the FDT of FIG. 1, illustrating a first plurality of adapters rotated downward generally about a horizontal axis;

FIG. 5 is a perspective view of the four pluralities of adapters of the FDT of FIG. 1, illustrating the second plurality of adapters rotated downward generally about a horizontal axis;

FIG. 6 is a perspective view of the four pluralities of adapters of the FDT of FIG. 1, illustrating the third plurality of adapters rotated downward generally about a horizontal axis;

FIG. 7 is an enlarged perspective view of the fourth plurality of adapters of the FDT of FIG. 1, illustrating a bracket at the upper end of the vertical bar, wherein the bracket defines a slot adapted to enable selective rotation of the plurality of adapters about a generally vertical axis;

FIG. 8 is an enlarged perspective view of the fourth plurality of adapters of the FDT of FIG. 1, illustrating the vertical bar repositioned relative to the bracket as compared to the view of FIG. 7;

FIG. 9 is an enlarged perspective view of the fourth plurality of adapters of the FDT of FIG. 1, illustrating the vertical bar rotated about a generally vertical axis relative to the view of FIG. 8;

FIG. 10 is schematic view of the bottom of the four pluralities of adapters of the FDT of FIG. 1, illustrating the horizontal hinge of the three pluralities of adapters and the bracket of the fourth plurality of adapters;

FIG. 11 is a perspective view of the FDT of FIG. 1, illustrating the cover selectively attached to the base;

FIG. 12 is a perspective view of an FDT in accordance with a second embodiment of the present invention, illustrating two pluralities of adapters and two splice trays mounted to the base, wherein the splice trays enable splicing of the drop cables to connectorized pigtails;

FIG. 13 is a perspective view of the FDT of FIG. 12, illustrating a first plurality of adapters rotated downward generally about a horizontal axis, wherein the latch comprises a fastener for positioning through an opening in the vertical bar of the plurality of adapters;

FIG. 14 is a perspective view of the FDT of FIG. 12, illustrating a second plurality of adapters rotated downward generally about a horizontal axis;

FIG. 15 is a perspective view of the FDT of FIG. 12, illustrating the selective removal of one splice tray from the base of the FDT;

FIG. 16 is an enlarged perspective view of grommets used in the FDTs of both of the embodiments of FIGS. 1 and 12, illustrating a first grommet adapted to receive 12 drop cables and a second grommet (on the right) adapted to receive 24 drop cables;

FIG. 17 is a perspective view of a strain relief device adapted for use with microstructured optical fiber in accordance with one embodiment of the present invention, illustrating the strain relief device within the FDT of FIG. 1 proximate the grommet of FIG. 16;

FIG. 18A is a perspective view of a grommet and plate assembly in accordance with another embodiment of the present invention, illustrating the grommets separated from the openings of the plate;

FIG. 18B is a perspective view of the grommet and plate assembly of FIG. 18A, illustrating the grommets inserted into the openings of the plate;

FIG. 19A is a perspective view of the grommet of the grommet and plate assembly of FIG. 18A, illustrating the central portion, the slit, and the tab portion;

FIG. 19B is a side schematic view of the grommet of FIG. 19A, illustrating the slot of the tab portion and the outer lip of the end cap portion;

FIG. 19C is an axial schematic view of the grommet of FIG. 19A, illustrating the slit extending generally radially through the central portion of the grommet;

FIG. 19D is an axial schematic view of the grommet of FIG. 19A, illustrating the end cap portion and the lead-in surface of the tab portion;

FIG. 20A is a perspective view of the plate of the grommet and plate assembly of FIG. 18A, illustrating the plurality of openings and the slot between the opposite axial faces of the plate;

FIG. 20B is a perspective view of the plate of FIG. 20A, illustrating the plurality of openings and the frustoconical inner surfaces of the openings;

FIG. 21A is a perspective view of the grommet and plate assembly of FIG. 18A received within an opening of network interface device ("NID") in accordance with a further embodiment of the present invention, illustrating the routing of the fiber optic cables out of the NID;

FIG. 21B is an additional perspective view of the grommet and plate assembly of FIG. 21A; and FIG. 22 is a schematic representation of the refractive index profile of a cross-section of the glass portion of an embodiment of a multimode optical fiber comprising a glass core and a glass cladding.

DETAILED DESCRIPTION OF THE INVENTION

The present invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Although apparatus and methods for providing sealed passage of fiber optic cables into and out of closures are described and shown in the accompanying drawings with regard to specific types of fiber optic closures, it is envisioned that the functionality of the various apparatus and methods may be applied to any now known or hereafter devised closures and related fiber optic network equipment in which it is desired to route fiber optic cables into and out of a fiber optic closure. Like numbers refer to like elements throughout.

With reference to FIGS. 1-17, fiber drop terminals ("FDTs") and associated equipment in accordance with some embodiments of the present invention are illustrated. Although these embodiments are described herein as being used as a network access point providing optical connection for distribution cable(s) and drop cables for multiple dwelling units ("MDUs"), it should be appreciated that the closures of embodiments of the present invention may be used at alternative positions within the fiber optic network to connect any optical fibers within the network. For example, the closures of the present invention include, but are not limited to, FDTs, network interface devices ("NIDs"), aerial terminals, pedestals, below grade terminals, fiber distribution hubs, fiber optic cabinets, and the like. Furthermore, although the illustrated embodiments are adapted for use within an MDU and do not include much of the standard features of outdoor hardware, further embodiments of the present invention include additional features, designs, components, and other functionalities adapted for use outside an MDU. As described more fully below, the illustrated embodiments of the present invention are described as using microstructured optical fiber; however, further embodiments of the present invention are adapted to include any alternative type of optical fiber. In addition, FDTs of certain embodiments of the present invention include many of the dimensional, functional, design, and other features of the fiber distribution terminals (also referred to as "FDTs" and which are generally synonymous with fiber drop terminals) disclosed in U.S. patent application Ser. No. 11/653,137 filed on Jan. 12, 2007 and disclosed in U.S. patent application Ser. No. 11/712,035 filed on Feb. 28, 2007, which are both assigned to the present assignee and the disclosures of which are incorporated in their entirety by reference herein.

Turning now to the embodiment of FIGS. 1-11, an FDT adapted for use in a fiber optic network of an MDU is provided. The FDT 10 enables a technician to selectively optically connect at least one connectorized optical fiber of a distribution cable (not shown) to a connectorized optical fiber of at least one drop cable (not shown). The FDT comprises a base 12 defining a back wall 14 and a sidewall 16 extending outwardly from the back wall. The back wall 14 of the illustrated embodiment comprises a two-part back wall to allow convenient removal of some of the hardware therein, whereas further embodiments of the present invention may comprise any number of back wall(s). The base 12 of FIGS. 1-11 defines four openings 18 for passage of the distribution cables and two openings 20 for passage of the drop cables through the sidewall 16. The term "passage" for purposes of this patent application shall include the passing of continuous optical fibers of the respective cable and shall also include the passage of optical signals communicated through the optical fibers even though the actual fiber may be terminated and joined to a second optical fiber, such as in a connector-adapter interface, a connector-connector interface, or any other use of optical waveguides. Therefore, "passage" of the optical fiber or cable is not limited to situations where the actual fiber or cable pass into or out of the base; the optical signal need only pass into or out of the base for there to be "passage." Referring to FIG. 2, the openings 18 for passage of the distribution cables comprise a multi-fiber adapter 19a for receiving a multi-fiber connector of the distribution cable (not shown), whereas the openings 20 for passage of the drop cables comprise grommets that allow the drop cables to pass directly through. For the embodiment of FIG. 2, a fanout device 19b is provided to divide the optical fibers of the multi-fiber adapter 19a into individual optical fibers routed to the connectors of the distribution cables described below. Further embodiments of the present invention also provide openings in the back wall to allow passage of the distribution cable(s) and/or drop cables.

The FDT of FIGS. 1-11 also includes a cover 22 adapted to selectively connect to the sidewall 16 generally opposite the back wall 14; however, further embodiments of the present invention provide the cover at any location relative to the back wall. The FDT 10 of FIGS. 1-11 also comprises four pluralities of adapters 24 joined to the back wall 14, whereas further embodiments provide the plurality of adapters at any location relative to the base and/or cover. The adapters 24 are adapted to receive a connector 26 of the distribution cable and a connector 28 of the drop cable to optically connect the connectorized optical fiber of the distribution cable to the connectorized optical fiber of the drop cable. The pluralities of adapters 24 of FIGS. 1-11 are pivotably joined to the base 12 to provide convenient access to each of the adapters while also allowing a relatively large number of adapters (compared to prior art FDTs) to be provided within the FDT.

Turning again to the cover 22 of FIG. 1, the cover defines a perimeter that on the top, left, and right sides defines a generally inwardly-facing groove that is adapted to receive a generally outwardly-facing lip 30 of the base to thereby enable the cover to slideably engage the sidewall 16 of the base 12. Further embodiments of the present invention include alternative designs to provide a cover that may be selectively connected to the base and/or that is selectively rotatable relative to the base.

Referring now to the pluralities of adapters 24 of the FDT of FIGS. 1-11, the adapters 24 are connected with a vertical bar 32 that comprises a horizontal hinge 34 at a bottom end of the vertical bar and a latch 36 adapted to enable selective rotation of the plurality of adapters about a generally horizontal axis. The hinge 34 may permanently attach the adapters 24 to the base 12, or the hinge 34 may allow selective removal of the adapters from the base. The latch 36 of the illustrated embodiment comprises two prongs that may be squeezed together to allow passage through a narrow slot to disconnect the vertical bar, and the narrow slot may taper inwards so that the vertical bar may be connected without squeezing the prongs together. Still further embodiments of the present invention comprise alternative devices for providing selectively moveable pluralities of adapters.

The vertical bars 32 of FIG. 3 each connect to twelve SC adapters 24, whereas further embodiments of the present invention connect any number of fiber optic connectors and any style of optical connectors, including but not limited to LC, FC, MTP, and any other single or multiple fiber connectors for single-mode or multi-mode fiber. The adapters 24 define axes that are generally oriented along a plane that is generally parallel to the back wall of the base to allow the FDT 10 to have a generally low profile. Although the adapters 24 are illustrated as extending in a generally horizontal direction, further embodiments of the present invention provide the adapters in a generally vertical direction (such that the "vertical" bar becomes "horizontal"). Still further embodiments of the present invention include adapters with axes that extend in a generally orthogonal direction relative to the back wall of the base and/or in other orientations.

The FDT 10 includes four pluralities of adapters 24, with the first three adapters (in order of their ability to be moved to access the plurality of adapters behind) having hinges 34 and latches 36 as described above. Each plurality of adapters 24 is positioned a certain distance from the back wall 14 to allow each of the pluralities of adapters to be selectively moved by a technician. As shown in FIG. 7, the fourth plurality of adapters 24 includes a vertical bar 32 that is joined to the base 14 by a bracket 38 at each end of the vertical bar. The bracket 38 defines a slot 40 adapted to enable selective rotation of the plurality of adapters about a vertical axis. The slot 40 receives a standoff device 42, such as a pin, and allows the pin to be moved within the slot a certain distance and/or direction to enable the adapters 24 (and any connected connectors) to be rotated a sufficient amount to allow convenient access to the adapters without causing the minimum bend radius of the associated optical fiber to be compromised by engaging the back wall 14 or the like. FIG. 9 illustrates the plurality of adapters 24 in a rotated position.

Turning now to the embodiment of FIG. 12, the FDT 110 includes similar pluralities of adapters 124, but with alternative devices for allowing selective movement of the pluralities of adapters. The pluralities of adapters 124 include a vertical bar 132 and a hinge 134; however, the latch 136 comprises an opening for receiving a fastening device, such as a screw, nut/bolt combination, wire tie, or the like. FIGS. 13 and 14 illustrate rotation of the pluralities of adapters 124 about the hinge 134. The FDT 110 of FIGS. 12-15 also includes two splice trays 150 that are mounted to the base 112 to enable splicing an optical fiber of the drop cable to a connectorized pigtail (the connector 128 is part of the pigtail, which is not otherwise shown). The splice trays are of the type described in the concurrently filed U.S. patent application entitled "Fiber Optic Splice Trays" that is assigned to the present assignee and the disclosure of which is incorporated by reference in its entirety herein. The splice tray 150 of the illustrated embodiment includes a slot 152 to selectively receive a tab 154 protruding from the back wall 114 of the base 112 to enable selective mounting of the splice tray to the base. Still further embodiments of the present invention comprise alternative devices for mounting one or more splice trays to the base. Still further embodiments of the present invention include FDTs with splitter devices provided within the FDT and other fiber optic hardware as desired.

FIG. 16 provides an enlarge view of the grommets 160 and 162 provided in the openings 20 of the FDT 10 of FIGS. 1-11, and also provided on the FDT 110 of FIGS. 12-15. The grommet 160 comprises twelve openings 164 for passage of twelve individual drop cables (not shown), and the grommet 162 comprises twenty-four openings 164 for passage of twenty-four individual drop cables. The openings 164 include slots 166 so that the cables may be placed within in the grommet without passing an end of the drop cable (which may or may not have a connector attached to the end) through the hole, thus making installation of the grommet more convenient. Alternative embodiments of the present invention comprise alternative grommets for generally sealing and retaining the openings in the base and/or cover of the FDT that allow passage of the fiber optic cables.

FIG. 17 illustrates a strain relief device 170 included in certain embodiments of the present invention that may be used in combination with the grommet 162 or further grommets of the present invention. The strain relief device 170 is adapted for use with microstructured optical fibers, as described more fully below, based upon the ability of such fibers to withstand a greater compression without causing excessive signal loss within the fiber. The strain relief device 170 comprises a body with a generally cylindrical shape that defines an axis generally aligned with the axis of the microstructured optical fibers 174 to be strain relieved. Along the perimeter of the body are provided a plurality of slots adapted to receive the microstructured optical fibers 174 (and any tubes, cables, or other assemblies associated therewith) such that a portion of the microstructured optical fibers is positioned radially outward of the perimeter of the body. Once the microstructured optical fibers are positioned within the slots of the body, a compression device 178 is positioned around the body 172 and the microstructured optical fibers 174 to apply a force upon the microstructured optical fibers to strain relieve the optical fibers. The body 170 defines a circumferential slot adapted to receive the compression device 178. The slot defines at least one shoulder 182 to prevent axial movement of the compression device. The compression device 178 of the illustrated embodiment comprises a wire tie device; however, further embodiments of the present invention comprise alternative compression devices to retain and/or seal the optical fibers to the strain relief device. As shown in FIG. 17, the FDT 10 or other closure into which the strain relief device 170 is installed may include a spring clip 184 mounted to a surface (such as the back wall 14) to selectively retain the strain relief device relative to the FDT or other closure. Further embodiments of the present invention include alternative devices for retaining the strain relief device relative to the fiber optic closure.

Turning now to the grommet and plate assembly 210 of FIGS. 18A-21B, the grommet and plate assembly 210 is provided by further embodiments of the present invention to replace grommets such as the grommets 160 of FIG. 16 and/or other grommets of alternative closures or the like. The grommet and plate assembly 210 comprises a plate 212 that comprises a relatively rigid material, such as a thermoplastic and/or metal to list two non-limiting examples, in the illustrated embodiment. The plate 212 is sized and shaped to be selectively received within the opening(s) of fiber optic closures, such as the FDT 10 of FIGS. 1-11 and/or the NID of FIGS. 21A-21B. In addition, the plate 212 includes a slot 214 between the opposed axial faces 216 and 218 of the plate, and the slot 214 is adapted to receive a protrusion of the opening of the closure, for example, the protrusion 220 of the opening 222 of the NID 224 of FIGS. 21A-21B, such that the interface of the protrusion and slot generally prevents axial movement of the plate relative to the closure when the plate is selectively received within the opening of the closure. Returning again to the assembly 210 of FIGS. 18A, 18B, 20A and 20B, the plate includes eight (8) openings 226, each of which defines a generally frustoconical inner surface 228 which generally corresponds to a generally frustoconical outer surface of the central portion of the grommet 230, as discussed further below. Further embodiments of the present invention include grommet and plate assemblies having alternative numbers of openings, including, but not limited to one, two, four, sixteen, thirty-two, and so forth; having alternative shapes of the inner surface; and having additional and/or alternative features. The plates 212 also include slots 232 extending from an outer edge of the plate to the openings 226, and the slots are sized to allow passage of the fiber optic cable in a generally radial direction (relative to the cable) so that the fiber optic cable can pass through the opening 226 prior to the selective insertion of the grommet 230 into the opening 226, as discussed more fully below.

The grommet 230 of FIGS. 19A-19D comprises a central portion 234 defining an axial opening 236 adapted to selectively receive the fiber optic cable, such as the fiber optic cables 238 of FIGS. 21A and 21B. The axial opening 236 of the illustrated embodiments is adapted to receive fiber optic cables of a diameter in the range from about 2.9 millimeters to about 4.8 millimeters as provided by the durometer of the elastomeric material comprising the grommet 230. Still further embodiments of the present invention comprise grommets of alternative durometers such that the range is greater or smaller, and still further embodiments of the present invention include grommets defining axial openings of any size and/or shape to allow passage of any type of fiber optic cable, such as cables with diameters less than 2.9 millimeters or greater than 4.8 millimeters and/or cables having non-circular cross-sections, such as flat drop cables to provide one non-limiting example.

Referring again to the grommet 230 of FIGS. 19A-19D, the central portion 234 of the illustrated embodiment defines a generally circular outer surface 240 which is further generally frustoconical along the axial direction. Therefore, the generally frustoconical outer surface 240 may generally correspond to the generally frustoconical inner surface 228 of the openings 226 of the plate 212 to provide an improved seal between the grommet and plate. The outer surface 240 of the illustrated embodiment also includes two ribs 242 that are axially offset from an end cap portion of the grommet. The ribs 242 are provided to further improve the seal between the grommet 230 and the plate 212. The grommet 230 comprises an elastomeric material that is deformable to provide a seal between the grommet and the plate 212 and between the grommet and the fiber optic cable 238 passing through the grommet. Still further embodiments of the present invention comprise additional and/or alternative features, shapes, materials, and the like to retain and/or seal the grommet, plate, and/or fiber optic cables. Still further embodiments of the present invention are adapted to provide passage of optical fibers with or without the external sheathing of fiber optic cables, with or without buffer tubes, and/or with or without other cable structures while still providing for passage of the optical fiber into and/or out of the fiber optic closure.

Turning again to the grommet 230 of FIGS. 19A-19D, the grommet further comprises a slit 246 extending in a generally radial direction from the outer surface 240 of the central portion 234 to the axial opening 236 of the central portion. The slit 246 is adapted to allow selective passage of the fiber optic cable 238 from outside the central portion 234 to the axial opening 236 of the central portion. This allows connectorized fiber optic cables and other cables that may include axial ends that are too large to be fed axially through the axial opening to be conveniently passed through the grommet 230. The slit 246 illustrated in FIGS. 19A-19D includes a radially straight portion 248 and two radially angled portions 250 and 252; however, further embodiments of the present invention comprise slits having only radially straight portions, only radially angled portions, curved portions, combinations of these portions, and/or alternative portions which allow a fiber optic cable to be passed from outside the central portion to the axial opening of the central portion.

The grommet 230 of FIGS. 19A-19D also includes an end cap portion 254 that is provided at an axial end 256 of the central portion 234. The end cap portion defines a selectively deformable outer lip 258 that generally overhangs the outer surface 240 of the central portion 234. The outer lip 258 of the illustrated embodiment is made of the same elastomeric material as the entire grommet 230; however, further embodiments of the present invention include end cap portions of alternative materials. The outer lip 258 of FIGS. 19A-19D is shaped such that the inserted grommet within an opening 226 of the plate 212 will be sealingly engaged by the outer lip and the axial face 218 such that sealing materials, such as RTV sealant, are unnecessary to seal the grommet to the plate. Furthermore, the end cap portion 254 includes a flapped axial opening 236 of the central portion, such that when the fiber optic cable 238 is passed through the flapped axial opening, the flaps provide a seal with the surface of the fiber optic cable, further obviating the need to provide the RTV sealant. Therefore, the grommet and plate assembly of various embodiments of the present invention may be used by field technicians without the use of sealing materials such as RTV sealant and the like.

Turning again to the grommet 230 of FIGS. 19A-19D, the grommet also comprises a tab portion 260 extending in a generally radial direction from the central portion 234. The tab portion 260 is sized to seal the slot 232 associated with the opening of the plate 212. Further embodiments of the present invention, in which the grommet is adapted for use directly with the closure (no plate required), the tab portion may be sized to seal a slot associated with the opening of the closure. Still further embodiments of the present invention include grommets with tab portions adapted for sealing with still further openings. The tab portion 260 includes a slot 262 between the axial ends of the tab portion, and the tab portion 260 also includes a lead-in surface 264 at an axial end proximate the end cap portion 254 of the grommet 230. Therefore, a field technician is able to more conveniently insert the grommet 230 with tab portion 260 into the opening 226 with slot 232 of the plate 212. The slot 262 is provided in the tab portion 260 to correspond with the slot 214 of the plate 212, such that the slots 262 and 214 are adapted to at least partially receive a protrusion of the opening of the closure, for example, the protrusion 220 of the opening 222 of the NID 224 of FIGS. 21A-21B, such that the interface of the protrusion and slot generally prevents axial movement of the plate and/or grommet relative to the closure when the grommet and plate assembly is selectively received within the opening of the closure.

The present invention further provides methods for routing a fiber optic cable 238 through an opening 222 of a fiber optic closure 224. The method comprises providing a grommet and plate assembly 210 adapted for use with the closure; positioning a grommet 230 of the grommet and plate assembly 210 around the fiber optic cable 238; inserting the grommet into an opening 226 of a plate 212 of the grommet and plate assembly; and placing the plate 212 within the opening 222 of the closure 224. The positioning of the grommet 230 around the fiber optic cable 238 may comprise pushing a portion of the fiber optic cable through a slit 246 of the grommet so that the fiber optic cable passes from outside a central portion 234 of the grommet to an axial opening 236 of the central portion sized to receive the fiber optic cable. In some embodiments of the present invention, inserting the grommet 230 into an opening 226 of the plate 212 comprises radially sliding the fiber optic cable through a slot 232 of the plate 212 and axially pushing the grommet 230 into the opening of the plate. In such situations, an end cap portion 254 of the central portion 234 of the grommet may extend beyond an axial face 218 of the plate 212 to sealingly retain the grommet within the opening of the plate. Various methods of further embodiments of the present invention also include radially sliding the plate 212 into the opening 222 of the closure 224 such that a protrusion 220 of the opening of the closure is received within a slot 214 of the plate to prevent axial movement of the plate relative to the closure when the plate is selectively received within the opening of the closure. Still further embodiments of the present invention include additional and/or alternative methods for passing a fiber optic cable into and/or out of a fiber optic closure while providing the desired sealing functionality to prevent and/or minimize the ingress of dust, dirt, water, wind-driven rain, infestation, and the like as required for the specific fiber optic closure.

Various embodiments of the present invention are adapted to include bend performance optical fibers. One example of bend performance optical fiber is a microstructured optical fiber having a core region and a cladding region surrounding the core region, the cladding region comprising an annular hole-containing region comprised of non-periodically disposed holes such that the optical fiber is capable of single mode transmission at one or more wavelengths in one or more operating wavelength ranges. The core region and cladding region provide improved bend resistance, and single mode operation at wavelengths preferably greater than or equal to 1500 nm, in some embodiments also greater than about 1310 nm, in other embodiments also greater than 1260 nm. The optical fibers provide a mode field at a wavelength of 1310 nm preferably greater than 8.0 microns, more preferably between about 8.0 and 10.0 microns. In preferred embodiments, optical fiber disclosed herein is thus single-mode transmission optical fiber.

In some embodiments of the present invention, the microstructured optical fibers disclosed herein comprises a core region disposed about a longitudinal centerline and a cladding region surrounding the core region, the cladding region comprising an annular hole-containing region comprised of non-periodically disposed holes, wherein the annular hole-containing region has a maximum radial width of less than 12 microns, the annular hole-containing region has a regional void area percent of less than about 30 percent, and the non-periodically disposed holes have a mean diameter of less than 1550 nm.

By "non-periodically disposed" or "non-periodic distribution", it is meant that when one takes a cross-section (such as a cross-section perpendicular to the longitudinal axis) of the optical fiber, the non-periodically disposed holes are randomly or non-periodically distributed across a portion of the fiber. Similar cross sections taken at different points along the length of the fiber will reveal different cross-sectional hole patterns, i.e., various cross-sections will have different hole patterns, wherein the distributions of holes and sizes of holes do not match. That is, the holes are non-periodic, i.e., they are not periodically disposed within the fiber structure. These holes are stretched (elongated) along the length (i.e. in a direction generally parallel to the longitudinal axis) of the optical fiber, but do not extend the entire length of the entire fiber for typical lengths of transmission fiber.

For a variety of applications, it is desirable for the holes to be formed such that greater than about 95% of and preferably all of the holes exhibit a mean hole size in the cladding for the optical fiber which is less than 1550 nm, more preferably less than 775 m, most preferably less than 390 nm. Likewise, it is preferable that the maximum diameter of the holes in the fiber be less than 7000 nm, more preferably less than 2000 nm, and even more preferably less than 1550 nm, and most preferably less than 775 nm. In some embodiments, the fibers disclosed herein have fewer than 5000 holes, in some embodiments also fewer than 1000 holes, and in other embodiments the total number of holes is fewer than 500 holes in a given optical fiber perpendicular cross-section. Of course, the most preferred fibers will exhibit combinations of these characteristics. Thus, for example, one particularly preferred embodiment of optical fiber would exhibit fewer than 200 holes in the optical fiber, the holes having a maximum diameter less than 1550 nm and a mean diameter less than 775 nm, although useful and bend resistant optical fibers can be achieved using larger and greater numbers of holes. The hole number, mean diameter, max diameter, and total void area percent of holes can all be calculated with the help of a scanning electron microscope at a magnification of about 800× and image analysis software, such as ImagePro, which is available from Media Cybernetics, Inc. of Silver Spring, Md., USA.

The optical fibers disclosed herein may or may not include germania or fluorine to also adjust the refractive index of the core and or cladding of the optical fiber, but these dopants can also be avoided in the intermediate annular region and instead, the holes (in combination with any gas or gases that may be disposed within the holes) can be used to adjust the manner in which light is guided down the core of the fiber. The hole-containing region may consist of undoped (pure) silica, thereby completely avoiding the use of any dopants in the hole-containing region, to achieve a decreased refractive index, or the hole-containing region may comprise doped silica, e.g. fluorine-doped silica having a plurality of holes.

In one set of embodiments, the core region includes doped silica to provide a positive refractive index relative to pure silica, e.g. germania doped silica. The core region is preferably hole-free. In some embodiments, the core region comprises a single core segment having a positive maximum refractive index relative to pure silica $\Delta_1$ in %, and the single core segment extends from the centerline to a radius R1. In one set of embodiments, 0.30%<$\Delta_1$<0.40%, and 3.0 µm<R1<5.0 µm. In some embodiments, the single core segment has a refractive index profile with an alpha shape, where alpha is 6 or more, and in some embodiments alpha is 8 or more. In some embodiments, the inner annular hole-free region extends from the core region to a radius R2, wherein the inner annular hole-free region has a radial width W12, equal to R2−R1, and W12 is greater than 1 µm. Radius R2 is preferably greater than 5 µm, more preferably greater than 6 µm. The intermediate annular hole-containing region extends radially outward from R2 to radius R3 and has a radial width W23, equal to R3−R2. The outer annular region 186 extends radially outward from R3 to radius R4. Radius R4 is the outermost radius of the silica portion of the optical fiber. One or more coatings may be applied to the external surface of the silica portion of the optical fiber, starting at R4, the outermost diameter or outermost periphery of the glass part of the fiber. The core region and the cladding region are preferably comprised of silica. The core region is preferably silica doped with one or more dopants. Preferably, the core region is hole-free. The hole-containing region has an inner radius R2 which is not more than 20 µm. In some embodiments, R2 is not less than 10 µm and not greater than 20 µm. In other embodiments, R2 is not less than 10 µm and not greater than 18 µm. In other embodiments, R2 is not less than 10 µm and not greater than 14 µm. Again, while not being limited to any particular width, the hole-containing region has a radial width W23 which is not less than 0.5 µm. In some embodiments, W23 is not less than 0.5 µm and not greater than 20 µm. In other embodiments, W23 is not less than 2 µm and not greater than 12 µm. In other embodiments, W23 is not less than 2 µm and not greater than 10 µm.

Such fiber can be made to exhibit a fiber cutoff of less than 1400 nm, more preferably less than 1310 nm, a 20 mm macrobend induced loss at 1550 nm of less than 1 dB/turn, preferably less than 0.5 dB/turn, even more preferably less than 0.1 dB/turn, still more preferably less than 0.05 dB/turn, yet more preferably less than 0.03 dB/turn, and even still more preferably less than 0.02 dB/turn, a 12 mm macrobend induced loss at 1550 nm of less than 5 dB/turn, preferably less than 1 dB/turn, more preferably less than 0.5 dB/turn, even more preferably less than 0.2 dB/turn, still more preferably less than 0.01 dB/turn, still even more preferably less than 0.05 dB/turn, and a 8 mm macrobend induced loss at 1550 nm of less than 5 dB/turn, preferably less than 1 dB/turn, more preferably less than 0.5 dB/turn, and even more preferably less than 0.2 dB-turn, and still even more preferably less than 0.1 dB/turn.

The fiber of some embodiments of the present invention comprises a core region that is surrounded by a cladding region that comprises randomly disposed voids which are contained within an annular region spaced from the core and positioned to be effective to guide light along the core region. Other optical fibers and microstructured fibers may be used in the present invention. Additional features of the microstructured optical fibers of additional embodiments of the present invention are described more fully in pending U.S. patent application Ser. No. 11/583,098 filed Oct. 18, 2006, and provisional U.S. patent application serial numbers 60/817,863 filed Jun. 30, 2006; 60/817,721 filed Jun. 30, 2006; 60/841,458 filed Aug. 31, 2006; 60/841,490 filed Aug. 31, 2006 and 60/879,164 filed Jan. 8, 2007; all of which are assigned to Corning Incorporated and the disclosures of which are incorporated by reference herein.

Still further embodiments of the present invention comprise fiber optic cables comprising bend resistant multimode optical fibers which comprise a graded-index core region and a cladding region surrounding and directly adjacent to the core region, the cladding region comprising a depressed-index annular portion comprising a depressed relative refractive index, relative to another portion of the cladding (which preferably is silica which is not doped with an index of refraction altering dopant such as germania or fluorine). Preferably, the refractive index profile of the core has a parabolic shape. The depressed-index annular portion may comprise glass comprising a plurality of holes, fluorine-doped glass, or fluorine-doped glass comprising a plurality of holes. The depressed index region can be adjacent to or spaced apart from the core region.

In some embodiments that comprise a cladding with holes, the holes can be non-periodically disposed in the depressed-index annular portion. By "non-periodically disposed" or "non-periodic distribution", we mean that when viewed in cross section (such as a cross section perpendicular to the longitudinal axis) of the optical fiber, the non-periodically disposed holes are randomly or non-periodically distributed across the hole containing region. Cross sections taken at different points along the length of the fiber will reveal different cross-sectional hole patterns, i.e., various cross sections will have different hole patterns, wherein the distributions of holes and sizes of holes do not match. That is, the voids or holes are non-periodic, i.e., they are not periodically located within the fiber structure. These holes are stretched (elongated) along the length (i.e. parallel to the longitudinal axis) of the optical fiber, but do not extend the entire length of the entire fiber for typical lengths of transmission fiber.

The multimode optical fiber disclosed herein exhibits very low bend induced attenuation, in particular very low macrobending. In some embodiments, high bandwidth is provided by low maximum relative refractive index in the core, and low bend losses are also provided. In some embodiments, the core radius is large (e.g. greater than 20 µm), the core refractive index is low (e.g. less than 1.0%), and the bend losses are low. Preferably, the multimode optical fiber disclosed herein exhibits a spectral attenuation of less than 3 dB/km at 850 nm.

The numerical aperture (NA) of the optical fiber is preferably greater than the NA of the optical source directing signals into the fiber; for example, the NA of the optical fiber is preferably greater than the NA of a VCSEL source. The bandwidth of the multimode optical fiber varies inversely with the square of $\Delta 1_{MAX}$. For example, a multimode optical fiber with $\Delta 1_{MAX}$ of 0.5% can yield a bandwidth 16 times greater than an otherwise identical multimode optical fiber except having a core with $\Delta 1_{MAX}$ of 2.0%.

In some embodiments, the core extends radially outwardly from the centerline to a radius R1, wherein $12.5 \leq R1 \leq 40$ microns. In some embodiments, $25 \leq R1 \leq 32.5$ microns, and in some of these embodiments, R1 is greater than or equal to about 25 microns and less than or equal to about 31.25 microns. The core preferably has a maximum relative refractive index, less than or equal to 1.0%. In other embodiments, the core has a maximum relative refractive index, less than or equal to 0.5%. Such multimode fibers preferably exhibit a 1 turn 10 mm diameter mandrel attenuation increase of no more than 1.0 dB, preferably no more than 0.5 dB, more preferably no more than 0.25 dB, even more preferably no more than 0.1 dB, and still more preferably no more than 0.05 dB, at all wavelengths between 800 and 1400 nm.

If non-periodically disposed holes or voids are employed in the depressed index annular region, it is desirable for the holes to be formed such that greater than 95% of and preferably all of the holes exhibit a mean hole size in the cladding for the optical fiber which is less than 1550 nm, more preferably less than 775 nm, most preferably less than about 390 nm. Likewise, it is preferable that the maximum diameter of the holes in the fiber be less than 7000 nm, more preferably less than 2000 nm, and even more preferably less than 1550 nm, and most preferably less than 775 nm. In some embodiments, the fibers disclosed herein have fewer than 5000 holes, in some embodiments also fewer than 1000 holes, and in other embodiments the total number of holes is fewer than 500 holes in a given optical fiber perpendicular cross-section. Of course, the most preferred fibers will exhibit combinations of these characteristics. Thus, for example, one particularly preferred embodiment of optical fiber would exhibit fewer than 200 holes in the optical fiber, the holes having a maximum diameter less than 1550 nm and a mean diameter less than 775 nm, although useful and bend resistant optical fibers can be achieved using larger and greater numbers of holes. The hole number, mean diameter, max diameter, and total void area percent of holes can all be calculated with the help of a scanning electron microscope at a magnification of about 800× and image analysis software, such as ImagePro, which is available from Media Cybernetics, Inc. of Silver Spring, Md., USA.

The optical fiber disclosed herein may or may not include germania or fluorine to also adjust the refractive index of the core and or cladding of the optical fiber, but these dopants can also be avoided in the intermediate annular region and instead, the holes (in combination with any gas or gases that may be disposed within the holes) can be used to adjust the manner in which light is guided down the core of the fiber. The hole-containing region may consist of undoped (pure) silica, thereby completely avoiding the use of any dopants in the hole-containing region, to achieve a decreased refractive index, or the hole-containing region may comprise doped silica, e.g. fluorine-doped silica having a plurality of holes.

FIG. 22 shows a schematic representation of the refractive index profile of a cross-section of the glass portion of an embodiment of a multimode optical fiber comprising a glass core 20 and a glass cladding 200, the cladding comprising an inner annular portion 30, a depressed-index annular portion 50, and an outer annular portion 60. In the embodiment illustrated in FIG. 22, the outer annular portion 60 has a substantially constant refractive index profile, as shown in FIG. 22 with a constant $\Delta 4(r)$; in some of these embodiments, $\Delta 4(r) = 0\%$. The "relative refractive index percent" is defined as $\Delta\% = 100 \times (n_i^2 - n_{REF}^2)/2n_i^2$. The relative refractive index percent is measured at 850 nm unless otherwise specified. In the embodiment illustrated in FIG. 22, the reference index $n_{REF}$ is the refractive index of inner annular portion 30. The core 20 is surrounded by and in direct contact with the inner annular portion 30, which has a substantially constant refractive index profile $\Delta 2(r)$. The inner annular portion 30 is surrounded by and in direct contact with the depressed-index annular portion 50 having refractive index profile $\Delta 3$, and the depressed-index annular portion 50 is surrounded by and in direct contact with the outer annular portion 60, which has a substantially constant refractive index profile $\Delta 4(r)$.

The core 20 has an entirely positive refractive index profile, where $\Delta 1(r) > 0\%$. In some embodiments, the inner annular portion 30 has a relative refractive index profile $\Delta 2(r)$ having a maximum absolute magnitude less than 0.05%, and $\Delta 2_{MAX} < 0.05\%$ and $\Delta 2_{MIN} > -0.05\%$, and the depressed-index annular portion 50 begins where the relative refractive index of the cladding first reaches a value of less than −0.05%, going radially outwardly from the centerline. In some embodiments, the outer annular portion 60 has a relative refractive index profile $\Delta 4(r)$ having a maximum absolute magnitude less than 0.05%, and $\Delta 4_{MAX} < 0.05\%$ and $\Delta 4_{MIN} > -0.05\%$, and the depressed-index annular portion 50 ends where the relative refractive index of the cladding first reaches a value of greater than −0.05%, going radially outwardly from the radius where $\Delta 3MIN$ is found. In some embodiments, the inner annular portion 30 comprises pure silica. In some embodiments, the outer annular portion 60 comprises pure silica. In some embodiments, the depressed-index annular portion 50 comprises pure silica comprising with a plurality of holes. Preferably, the minimum relative refractive index, or average effective relative refractive index, such as taking into account the presence of any holes, of the depressed-index annular portion 50 is preferably less than −0.1%. The holes can contain one or more gases, such as argon, nitrogen, or oxygen, or the holes can contain a vacuum with substantially no gas; regardless of the presence or absence of any gas, the refractive index in the annular portion 50 is lowered due to the presence of the holes. The holes can be randomly or non-periodically disposed in the annular portion 50 of the cladding 200, and in other embodiments, the holes are disposed periodically in the annular portion 50. In some embodiments, the plurality of holes comprises a plurality of non-periodically disposed holes and a plurality of periodically disposed holes. Alternatively, or in addition, the depressed index in annular portion 50 can also be provided by downdoping the annular portion 50 (such as with fluorine) or updoping one or more portions of the cladding and/or the core, wherein the depressed-index annular portion 50 is, for example, pure silica or silica which is not doped as heavily as the inner annular portion 30.

Preferably, the inner annular portion 30 has a radial width of greater than 4 microns. In some embodiments, the minimum relative refractive index of the depressed-index annular portion 50, Δ3MIN, is less than −0.10%; in other embodiments, Δ3MIN is less than −0.20%; in still other embodiments, Δ3MIN is less than −0.30%; in yet other embodiments, Δ3MIN is less than −0.40%.

$\Delta 1_{MAX}$ is preferably less than or equal to 2.0%, more preferably less than or equal to 1.0%, even more preferably less than 1.0%, and still more preferably less than or equal to 0.8%; in some embodiments $\Delta 1_{MAX}$ is greater than or equal to 0.4% and less than or equal to 1.0%, and in other embodiments $\Delta 1_{MAX}$ is greater than or equal to 0.5% and less than or equal to 0.75%.

The numerical aperture (NA) of the optical fiber is preferably greater than the NA of the optical source directing signals into the fiber; for example, the NA of the optical fiber is preferably greater than the NA of a VCSEL source. The bandwidth of the multimode optical fiber varies inversely with the square of $\Delta 1_{MAX}$. For example, a multimode optical fiber with $\Delta 1_{MAX}$ of 0.5% can yield a bandwidth 16 times greater than an otherwise identical multimode optical fiber except having a core with $\Delta 1_{MAX}$ of 2.0%.

In some embodiments, the core outer radius, $R_1$, is preferably not less than 12.5 μm and not more than 40 μm, i.e. the core diameter is between about 25 and 80 μm. In other embodiments, R1>20 microns; in still other embodiments, R1>22 microns; in yet other embodiments, R1>24 microns.

Many modifications and other embodiments of the invention set forth herein will come to mind to one skilled in the art to which the invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. It is intended that the present invention cover the modifications and variations of this invention provided they come within the scope of the appended claims and their equivalents. Although specific terms are employed herein, they are used in a generic and descriptive sense only and not for purposes of limitation.

That which is claimed:

1. A grommet adapted for use with a fiber optic closure adapted to receive the grommet to provide a substantially sealed passage for a fiber optic cable passing through an opening in the closure, the grommet comprising:
   a central portion defining an axial opening adapted to selectively receive the fiber optic cable, wherein the central portion defines an outer surface;
   a slit extending in a generally radial direction from the outer surface of the central portion to the axial opening of the central portion, wherein the slit is adapted to allow selective passage of the fiber optic cable from outside the central portion to the axial opening of the central portion;
   a tab portion extending in a generally radial direction from the central portion; and
   an end cap portion provided at an axial end of the central portion, the end cap portion defining a selectively deformable outer lip that generally overhangs the outer surface of the central portion.

2. A grommet according to claim 1, wherein the central portion defines a generally circular outer surface.

3. A grommet according to claim 1, wherein the outer surface of the central portion defines a generally frustoconical surface extending in a generally axial direction.

4. A grommet according to claim 1, wherein the outer surface of the central portion defines at least one rib axially offset from the end cap portion.

5. A grommet according to claim 1, wherein the end cap portion defines a generally curved surface opposite the axial end of the central portion, such that the end cap portion facilitates selective insertion of the grommet through the opening of the closure.

6. A grommet according to claim 1, wherein the tab portion is sized to seal a slot associated with the opening of the closure.

7. A grommet according to claim 6, wherein the tab portion includes a slot between axial ends of the tab portion.

8. A grommet according to claim 6, wherein the tab portion includes a lead-in surface at an axial end proximate the end cap portion of the grommet.

9. A grommet according to claim 6, wherein the axial opening of the central portion is adapted to receive fiber optic cables of a diameter in a range from about 2.9 millimeters to about 4.8 millimeters.

10. A grommet and plate assembly adapted for use with a fiber optic closure adapted to receive the grommet and plate assembly to provide a substantially sealed passage for a fiber optic cable passing through an opening in the closure, the grommet and plate assembly comprising:
    a plate comprising a plurality of openings, wherein the plate is adapted to be selectively received within the opening of the closure; and
    at least one grommet adapted for selective insertion into an opening of the plate, the grommet comprising:
       a central portion defining an axial opening adapted to selectively receive the fiber optic cable, wherein the central portion defines an outer surface;
       a slit extending in a generally radial direction from the outer surface of the central portion to the axial opening of the central portion, wherein the slit is adapted to allow selective passage of the fiber optic cable from outside the central portion to the axial opening of the central portion;
       a tab portion extending in a generally radial direction from the central portion; and
       an end cap portion provided at an axial end of the central portion, the end cap portion defining a selectively deformable outer lip that generally overhangs the outer surface of the central portion.

11. A grommet and plate assembly according to claim 10, wherein the central portion defines a generally circular outer surface.

12. A grommet and plate assembly according to claim 10, wherein the outer surface of the central portion defines a generally frustoconical surface extending in a generally axial direction.

13. A grommet and plate assembly according to claim 10, wherein the outer surface of the central portion defines at least one rib axially offset from the end cap portion.

14. A grommet and plate assembly according to claim 10, wherein the end cap portion defines a generally curved surface opposite the axial end of the central portion, such that the end cap portion facilitates selective insertion of the grommet through the opening of the plate.

15. A grommet and plate assembly according to claim 10, wherein the tab portion is sized to seal a slot associated with the opening of the plate.

16. A grommet and plate assembly according to claim 15, wherein the plate comprises a slot between opposed axial faces of the plate, wherein the slot is adapted to receive a protrusion of the opening of the closure such that the interface of the protrusion and slot generally prevent axial movement of the plate relative to the closure when the plate is selectively received within the opening of the closure.

17. A grommet and plate assembly according to claim 15, wherein the tab portion includes a lead-in surface at an axial end proximate the end cap portion of the grommet.

18. A method of routing at least one fiber optic cable through an opening of a fiber optic closure, the method comprising:

provide a grommet and plate assembly adapted for use with the closure;

positioning a grommet of the grommet and plate assembly around the fiber optic cable;

radially sliding the fiber optic cable through a slot of a plate of the grommet and plate assembly;

inserting the grommet into an opening of the plate; and placing the plate within the opening of the closure.

19. The method of claim 18, wherein positioning the grommet around the fiber optic cable comprises pushing a portion of the fiber optic cable through a slit of the grommet so that the fiber optic cable passes from outside a central portion of the grommet to an axial opening of the central portion sized to receive the fiber optic cable.

20. The method of claim 18, wherein inserting the grommet into an opening of the plate comprises:

axially pushing the grommet into the opening of the plate, wherein an end cap portion of a central portion of the grommet extends beyond an axial face of the plate to sealingly retain the grommet within the opening of the plate.

21. The method of claim 18, wherein placing the plate within the opening of the closure comprises radially sliding the plate into the opening of the closure such that a protrusion of the opening of the closure is received within a slot of the plate to prevent axial movement of the plate relative to the closure when the plate is selectively received within the opening of the closure.

* * * * *